US 12,200,478 B2

(12) United States Patent
Wallentin et al.

(10) Patent No.: US 12,200,478 B2
(45) Date of Patent: Jan. 14, 2025

(54) USER EQUIPMENT, TARGET ACCESS NODE AND METHODS IN A WIRELESS COMMUNICATIONS NETWORK FOR HANDLING PACKET DATA CONVERGENCE PROTOCOL (PDCP) SERVICE DATA UNITS (SDU) WHEN PERFORMING A DUAL ACTIVE PROTOCOL STACK (DAPS) HANDOVER

(71) Applicant: Telefonaktiebolaget LM Ericsson (publ), Stockholm (SE)

(72) Inventors: Pontus Wallentin, Linköping (SE); Johan Rune, Lidingö (SE); Oscar Ohlsson, Bromma (SE); Claes-Göran Persson, Mjölby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 333 days.

(21) Appl. No.: 17/633,248

(22) PCT Filed: Jun. 23, 2020

(86) PCT No.: PCT/SE2020/050648
§ 371 (c)(1),
(2) Date: Feb. 7, 2022

(87) PCT Pub. No.: WO2021/029799
PCT Pub. Date: Feb. 18, 2021

(65) Prior Publication Data
US 2022/0361060 A1 Nov. 10, 2022

Related U.S. Application Data

(60) Provisional application No. 62/886,378, filed on Aug. 14, 2019.

(51) Int. Cl.
H04W 76/30 (2018.01)
H04W 36/00 (2009.01)
H04W 36/08 (2009.01)

(52) U.S. Cl.
CPC ....... *H04W 76/30* (2018.02); *H04W 36/0055* (2013.01); *H04W 36/00837* (2018.08);
(Continued)

(58) Field of Classification Search
CPC ............. H04W 36/0069; H04W 76/30; H04W 36/00837
See application file for complete search history.

(56) References Cited

U.S. PATENT DOCUMENTS 11,950,150 B2 * 4/2024 Awada ............... H04W 36/0079
2016/0029235 A1 * 1/2016 Kim ....................... H04W 24/08
370/252

(Continued)

FOREIGN PATENT DOCUMENTS

CN    109982360 A    7/2019
WO    2018142308 A1  8/2018

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.6.0, Jun. 1, 2019, pp. 1-960, 3GPP.

(Continued)

*Primary Examiner* — Chi H Pham
*Assistant Examiner* — Weibin Huang
(74) *Attorney, Agent, or Firm* — COATS & BENNETT, PLLC

(57) ABSTRACT

The present disclosure relates to telecommunications. In one of its aspects, the disclosure concerns a method performed (Continued)

by a User Equipment for handling Packet Data Convergence Protocol (PDCP) Service Data Units (SDUs) when performing a Dual Active Protocol Stack (DAPS) handover of at least one radio bearer from a source access node to a target access node in a wireless communications network. The method comprises obtaining a trigger to perform the handover and establishing a radio connection for the at least one radio bearer with the target access node. An uplink transmission of PDCP SDUs is switched from the source to the target access node over the established radio connection. A radio connection with the source access node is released and a PDCP status report is transmitted to the target access node for each configured radio bearer. The respective PDCP status report indicates PDCP Sequence Numbers (SNs) of missing PDCP SDUs.

18 Claims, 19 Drawing Sheets

(52) U.S. Cl.
CPC ........ *H04W 36/08* (2013.01); *H04W 36/0064* (2023.05); *H04W 36/00695* (2023.05)

(56) References Cited

U.S. PATENT DOCUMENTS

| | | | |
|---|---|---|---|
| 2019/0166528 | A1 | 5/2019 | Zhang |
| 2020/0322860 | A1 | 10/2020 | Yan et al. |
| 2020/0351725 | A1* | 11/2020 | Kim ..................... H04W 76/15 |
| 2020/0374773 | A1* | 11/2020 | Zhang ................ H04W 36/305 |
| 2021/0014924 | A1* | 1/2021 | Zheng .................. H04W 28/02 |
| 2021/0282050 | A1* | 9/2021 | Adjakple ............. H04L 1/1874 |

OTHER PUBLICATIONS

3rd Generation Partnership Project, "3rd Generation Partnership Project; Technical Specification Group Radio Access Network; Evolved Universal Terrestrial Radio Access (E-UTRA); Study on latency reduction techniques for LTE (Release 14)", Technical Report, 3GPP TR 36.881 V14.0.0, Jun. 1, 2016, pp. 1-99, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Technical Specification, 3GPP TS 36.300 V15.6.0, Jun. 1, 2019, pp. 1-365, 3GPP.

3rd Generation Partnership Project, "3rd Generation Partnership Project; Technical Specification Group Radio Access Network; NR; NR and NG-RAN Overall Description; Stage 2 (Release 15)", Technical Specification, 3GPP TS 38.300 V15.6.0, Jun. 1, 2019, pp. 1-99, 3GPP.

3rd Generation Partnership Project, "3rd Generation Partnership Project; Technical Specification Group Radio Access Network; Evolved Universal Terrestrial Radio Access (E-UTRA); Packet Data Convergence Protocol (PDCP) specification (Release 15)", Technical Specification, 3GPP TS 36.323 V15.4.0, Jun. 1, 2019, pp. 1-52, 3GPP.

3rd Generation Partnership Project, "3rd Generation Partnership Project; Technical Specification Group Radio Access Network; Evolved Universal Terrestrial Radio Access (E-UTRA) and NR; Multi-connectivity; Stage 2 (Release 15)", Technical Specificaiton, 3GPP TS 37.340 V15.6.0, Jun. 1, 2019, pp. 1-69, 3GPP.

3rd Generation Partnership Project, "3rd Generation Partnership Project; Technical Specification Group Radio Access Network; NR; Packet Data Convergence Protocol (PDCP) specification (Release 15)", Technical Specification, 3GPP TS 38.323 V15.6.0, Jun. 1, 2019, pp. 1-26, 3GPP.

China Telecom, "Running CR for introduction of even further mobility enhancement in E-UTRAN", 3GPP TSG-RAN WG2 #106, Reno, USA, May 13, 2019, pp. 1-14, R2-1908271, 3GPP.

Ericsson, "Enhancements to Make-Before-Break for dual active protocol stacks", 3GPP TSG-RAN WG2 #106, Reno, USA, May 13, 2019, pp. 1-6, R2-1907310, 3GPP.

Ericsson, "Enhancements to Make-Before-Break", 3GPP TSG-RAN WG2 #105, Athens, Greece, Feb. 25, 2019, pp. 1-6, R2-1901085, 3GPP.

* cited by examiner

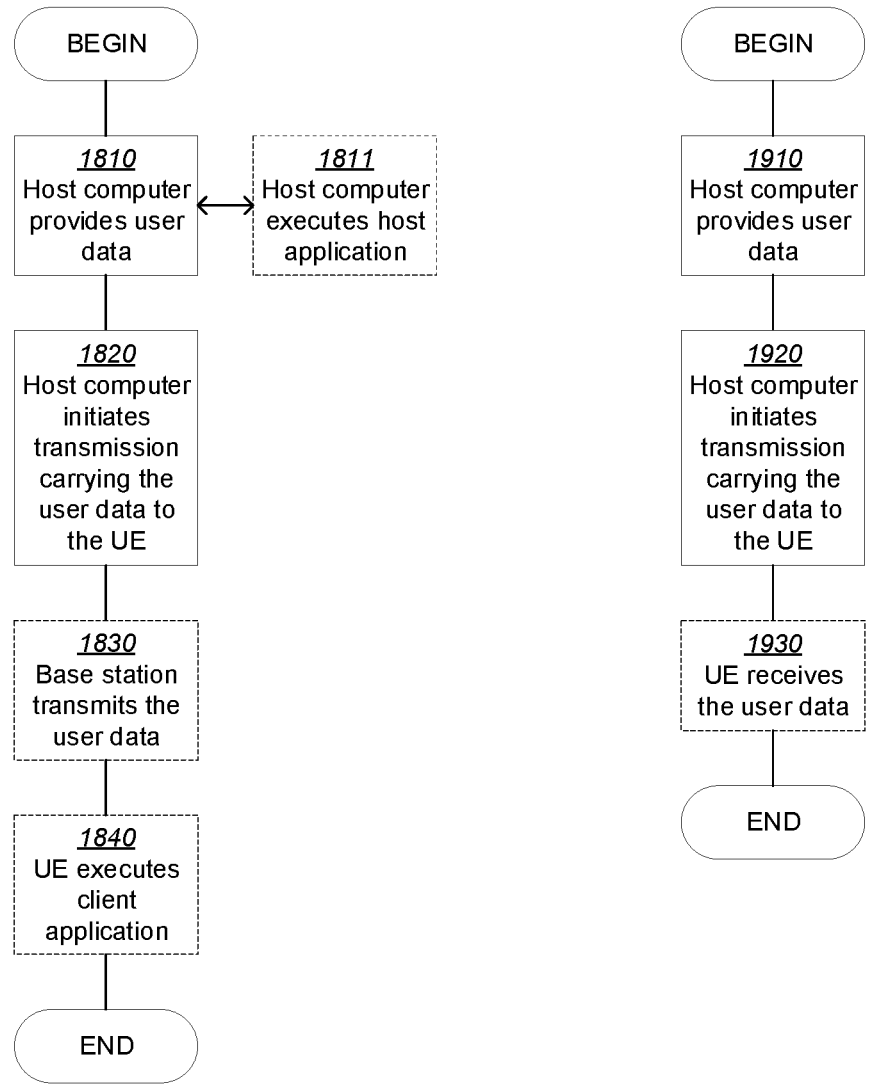

USER EQUIPMENT, TARGET ACCESS NODE AND METHODS IN A WIRELESS COMMUNICATIONS NETWORK FOR HANDLING PACKET DATA CONVERGENCE PROTOCOL (PDCP) SERVICE DATA UNITS (SDU) WHEN PERFORMING A DUAL ACTIVE PROTOCOL STACK (DAPS) HANDOVER

TECHNICAL FIELD

The present disclosure generally relates to telecommunications and embodiments herein relate to a user equipment, a target access node and methods performed therein. In particular, the various embodiments described in this disclosure relate to apparatuses and methods for handling Packet Data Convergence Protocol (PDCP) Service Data Units (SDUs) when performing a Dual Active Protocol Stack (DAPS) handover of at least one radio bearer from a source access node to a target access node.

BACKGROUND

In a typical wireless communication network, wireless devices, also known as wireless communication devices, mobile stations, stations (STA) and/or User Equipment (UE), communicate via a Local Area Network (LAN) such as a Wi-Fi network or a Radio Access Network (RAN) to one or more Core Networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to Radio Network Controllers (RNCs) used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Wireless Communication Systems in 3GPP

FIG. 1 illustrates a simplified wireless communication system. Consider the simplified wireless communication system in FIG. 1, with a UE 12, which communicates with one or multiple access nodes 103-104, which in turn is connected to a network node 106. The access nodes 103-104 are part of the radio access network 10.

For wireless communication systems pursuant to 3GPP EPS, also referred to as LTE, or 4G, standard specifications, such as specified in 3GPP TS 36.300, v.15.6.0 and related specifications, the access nodes 103-104 corresponds typically to eNBs and the network node 106 corresponds typically to either a Mobility Management Entity (MME) and/or a Serving Gateway (SGW). The eNB is part of the radio access network 10, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300, v.15.6.0 and related specifications, on the other hand, the access nodes 103-104 corresponds typically to an 5G NodeB (gNB) and the network node 106 corresponds typically to either an Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Mobility in RRC_CONNECTED in LTE and NR

Mobility in RRC_CONNECTED state is also known as handover. The purpose of handover is to move the UE, due to e.g. mobility, from a source access node using a source radio connection, also known as source cell connection, to a target access node, using a target radio connection, also known as target cell connection. The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs.

These cases are also referred to as inter-node handover, inter-eNB handover or inter-gNB handover. In other cases, the source access node and target access node are the same node, such as the same eNB and gNB. These cases are also referred to as intra-node handover, intra-eNB handover or intra-gNB handover and covers the case when source and target cells are controlled by the same access node. In yet other cases, handover is performed within the same cell (and thus also within the same access node controlling that cell)—these cases are also referred to as intra-cell handover.

It should therefore be understood that the source access node and target access node refers to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE, in LTE an RRConnectionReconfiguration message with a field called mobilityControlInfo and in NR an RRCReconfiguration message with a reconfigurationWithSync field.

These reconfigurations are actually prepared by the target access node upon a request from the source access node, over X2 or S1 interface in case of EUTRA-EPC or Xn or NG interface in case of NG-RAN-5GC, and takes into account the existing RRC configuration and UE capabilities as provided in the request from the source access node and its own capabilities and resource situation in the intended target cell and target access node. The reconfiguration parameters provided by the target access node contains, for example, information needed by the UE to access the target access node, e.g., random access configuration, a new C-RNTI assigned by the target access node and security parameters enabling the UE to calculate new security keys associated to the target access node so the UE can send a Handover Complete message, in LTE an RRConnectionReconfiguratioComplete message and in NR an RRCReconfiguration-Complete message, on SRB1 encrypted and integrity protected based on new security keys upon accessing the target access node.

FIG. 2 depicting a Handover in LTE summarizes the signaling flow between UE, source access node, also known as source gNB, source eNB or source cell, and target access node, also known as target gNB, target eNB or target cell, during a handover procedure, using LTE as example.

User Plane Handling During Handover

Depending on the required Quality of Service (QoS), either a seamless or a lossless handover is performed as appropriate for each user plane radio bearer, as explained in the following subsections.

Seamless Handover

Seamless handover is applied for user plane radio bearers mapped on Radio Link Control (RLC) Unacknowledged Mode (UM). These types of data are typically reasonably tolerant of losses but less tolerant of delay, e.g. voice services. Seamless handover is therefore designed to minimize complexity and delay but may result in loss of some Packet Data Convergence Protocol (PDCP) Service Data Units (SDUs). At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/ Xn interface to the target access node. PDCP SDUs for which the transmission has already started but that have not been successfully received will be lost. This minimizes the complexity because no context, i.e. configuration information, has to be transferred between the source access node and the target access node at handover.

Lossless Handover

Based on the Sequence Number (SN) that is added to PDCP Data Protocol Data Units (PDUs) it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-)transmission. The source access node receives an indication from the gateway that indicates the last packet sent to the source access node, a so called "end marker" packet. The source access node also forwards this indication to the target access node so that the target access node knows when it can start transmission of packets received from the gateway.

In order to ensure lossless handover in the uplink (UL), the UE retransmits the UL PDPC SDUs that are stored in the PDCP retransmission buffer. The retransmission is triggered by the PDCP re-establishment that is performed upon reception of the handover command. The source access node, after decryption and decompression, will forward all PDCP SDUs received out of sequence to the target access node. Thus, the target access node can reorder the PDCP SDUs received from the source access node and the retransmitted PDCP SDUs received from the UE based on the PDCP SNs, which are maintained during the handover, and deliver them to the gateway in the correct sequence.

An additional feature of lossless handover is so-called selective re-transmission. In some cases, it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions a PDCP status report can be sent from the target access node to the UE and from the UE to the target access node. Whether to send a PDCP status report after handover is configured independently for each radio bearer and for each direction.

Rel-14 Make-Before-Break Handover

Handover interruption time is typically defined as the time from the UE stops transmission/reception with the source access node until the target access node resumes transmission/reception with the UE. Handover is configured independently for each radio bearer and for each direction.

In LTE pre-Rel-14, according to 3GPP TR 36.881, v.14.0.0, the handover interruption time is at least 45 ms. In LTE and NR, different solutions to decrease the handover interruption time have since then been discussed. Improvements are driven for example by new service requirements on low latency, e.g. aerial, industrial automation, industrial control, for which low interruption time shall be guaranteed.

As an example of one such improvement, Make-Before-Break (MBB) was introduced in LTE Rel-14 in purpose to shorten handover interruption time as close to 0 ms as possible. Please see FIG. 3 depicting Rel-14 LTE MBB.

The MBB handover procedure as introduced in LTE Rel-14, refers to a handover mechanism where the UE connects to the target cell before disconnecting from the source cell unlike the standard handover procedure where the UE resets MAC and re-establishes RLC and PDCP upon receiving the Handover Command message, RRCConnectionReconfiguration message with mobilityControlInfo, in the source cell. The mobilityControlInfo in the RRCConnectionReconfiguration message includes a field makeBeforeBreak, to instruct the UE 120 to keep the connection to the source cell 103. From 3GPP TS 36.331, v.15.6.0:

--- makeBeforeBreak
Indicates that the UE shall continue uplink transmission/downlink reception with the source cell(s) before performing the first transmission through PRACH to the target intra-frequency PCell, or performing initial PUSCH transmission to the target intra-frequency PCell while rach-Skip is configured.

---

NOTE 1a: It is up to UE implementation when to stop the uplink transmission/downlink reception with the source cell (s) to initiate re-tuning for connection to the target cell, as specified in TS 36.133 [16], if makeBeforeBreak is configured.

In the MBB solution, the connection to the source cell is maintained after the reception of Handover Command until the UE executes initial UL transmission in the target cell, i.e. MAC reset and RLC and PDCP re-establishment is delayed in the UE until the UE performs random-access in the target cell or, if MBB is combined with RACH-less handover (i.e. rach-Skip is present in the mobilityControlInfo), until the UE performs the initial PUSCH transmission. It is up to UE implementation (and UE capabilities) when to stop the UL transmission/DL reception with the source cell to initiate re-tuning for connection to the target cell.

At the point when the source eNB has stopped transmission/reception to/from the UE, the source eNB sends the SN STATUS TRANSFER message (step 8) to the target eNB to convey the uplink PDCP SN receiver status and the downlink PDCP SN transmitter status of the radio bearers for which PDCP status preservation applies.

MBB as specified in LTE Rel-14 (3GPP TS 36.300 v.15.6.0 and TS 36.331, v.15.6.0) has some known limitations: Even if MBB and other improvements, such as RACH-less handover are combined, it is still not possible to reach ~0 ms handover interruption time. MBB in Rel-14 is only supported for intra-frequency handovers and assumes the UE is equipped with a single Rx/Tx chain. In an intra-frequency handover scenario, a single Rx UE is capable of receiving from both target and source cell simultaneously, however, a single Tx UE will not be able to transmit to both cells simultaneously. Thus, in MBB Rel-14, the UE will release the connection to the source cell before the first UL transmission. This occurs when the UE transmits the RACH preamble; or transmits the Handover Complete message, if RACH-less HO is configured.

Consequently, the UE releases the connection with the source cell before the connection with the target cell is ready for packet transmission/reception, which results in interruption time of ~5 ms.

SUMMARY

Rel-16 Enhanced Make-Before-Break (eMBB)

To address the shortcomings of Rel-14 MBB and achieve ~0 ms interruption time an enhanced version of Make-Before-Break (eMBB) is being discussed for Rel-16 for both LTE and NR. In this enhanced version, it is assumed that the UE is capable of simultaneously transmitting and receiving from the source and target cell. In practice, this may require that the UE is equipped with dual Tx/Rx chains. The dual Tx/Rx chains potentially also allows eMBB to be supported in other handover scenarios such as inter-frequency handover.

An example of an eMBB inter-node handover is illustrated in FIG. 4 for the case of LTE.

Some highlights in this solution are:

In step 405, upon receiving the "eMBB" indication in the Handover Command, the UE maintains the connection to the source access node while establishing the connection to the target access node. That is, the UE can send and receive DL/UL user plane data via the source access node between step 405-408 without any interruption. And after step 408, the UE has the target link available for UL/DL user plane data transmission similar to the regular HO procedure.

In step 406, the source access node sends an SN status transfer message to the target access node, indicating UL PDCP receiver status and the SN of the first forwarded DL PDCP SDU. The uplink PDCP SN receiver status includes at least the PDCP SN of the first missing UL SDU and may include a bit map of the receive status of the out of sequence UL SDUs that the UE needs to retransmit in the target cell, if there are any such SDUs. The SN Status Transfer message also contains the Hyper Frame Number (HFN) of the first missing UL SDU as well as the HFN DL status for COUNT preservation in the target access node.

Once the connection setup with the target access node is successful, i.e. after sending the Handover Complete message in step 408, the UE maintains two data links, one to the source access node and one to the target access node. After step 408, the UE transmits the UL user plane data on the target access node similar to the regular HO procedure using the target access node security keys and compression context. Thus, there is no need for UL user plane data transmission to both nodes, which avoids UE power splitting between two nodes and also simplifies UE implementation. In the case of intra-frequency handover, transmitting UL user plane data to one node at a time also reduces UL interference, which increases the chance of successful decoding at the network side.

The UE needs to maintain the security and compression context for both source access node and target access node until the source link is released. The UE can differentiate the security/compression context to be used for a PDCP PDU based on the cell which the PDU is transmitted on.

To avoid packet duplication, the UE may send a PDCP status report together with the Handover Complete message in step 408, indicating the last received PDCP SN. Based on the PDCP status report, the target access node can avoid sending duplicate PDCP packets (i.e. PDCP PDUs with identical sequence numbers) to the UE, i.e. PDCP packets which were already received by the UE in the source cell.

The release of the source cell in step 413 can e.g. be triggered by an explicit message from the target access node (not shown in the figure) or by some other event such as the expiry of a release timer.

As an alternative to source access node starting packet data forwarding after step 405 (i.e. after sending the Handover Command to the UE), the target access node may indicate to the source access node when to start packet data forwarding. For instance, the packet data forwarding may start at a later stage when the link to the target cell has been established, e.g. after the UE has performed random access in the target cell. By starting the packet data forwarding in the source access node at a later stage, the number of duplicated PDCP SDUs received by the UE from the target cell will potentially be less and by that the DL latency will be somewhat reduced. However, starting the packet data forwarding at a later stage is also a trade-off between robustness and reduced latency if, e.g., the connection between the UE and the source access node is lost before the connection to the target access node is established. In such case, there will be a short interruption in the DL data transfer to the UE.

FIG. 5 shows the protocol stack at the UE side in eMBB. Each user plane radio bearer has an associated PDCP entity, which in turn has two associated RLC entities—one for the source cell and one for the target cell. The PDCP entity uses different security keys and ROHC contexts for the source and target cell while the SN allocation (for UL transmission) and re-ordering/duplication detection (for DL reception) is common.

Note that in case of NR, there is an additional protocol layer called SDAP on top of PDCP which is responsible for mapping QoS flows to bearers. This layer is not shown in FIG. 5 and will not be discussed further in this document.

Note that the name "Enhanced Make-Before-Break" is not agreed yet and other names have also been proposed, such as "Handover with simultaneous connectivity", "Dual Active Protocol Stack (DAPS)" etc. It also possible that LTE and NR will use different names for the feature. For example, LTE might use the name "Enhanced Make-Before-Break" to distinguish it from the LTE Rel-14 Make-Before-Break, while NR may use the name "Make-Before-Break" since NR does not have any such legacy procedure. These names will be used interchangeably through this application.

Conditional Handover

In 3GPP release 16, a conditional handover procedure is being specified by 3GPP RAN2. Conditional handover addresses reliability issues which can occur during handover, such as that the measurement report from the UE or the handover command from the network is lost due to bad quality of the radio link between the UE and the source access node, which typically is the case when the handover is performed at the cell edge.

The principle for conditional handover (CHO) procedure is illustrated in FIG. 6. The idea with conditional handover is to transmit the handover command earlier, to avoid the bad cell edge radio.

In conditional handover the network configures the UE with triggering conditions for when a handover should be executed, using the CHO configuration message in FIG. 6. This message can be sent at any point in time, not only when handover is imminent. When the conditions, such as an A3 type of event implying that a neighbour cell becomes an offset better than serving cell, are fulfilled, instead of sending a measurement report to the network, the UE directly executes the handover towards the target access node controlling the neighbour cell which satisfied the condition, without any further order from the network. The advantage of the procedure is that the HO Command like message, CHO configuration in FIG. 6, may be provided to the UE at an earlier stage before the radio conditions have become poor, which increases the chance of a successful transmission of the message, and there is no measurement report to be lost as in traditional handover.

When the source node prepares a potential target node, it uses the HO preparation procedure over X2/Xn, including a CHO indicator in the HO Request and the current UE configuration. Based on that configuration and other information exchanged during CHO preparation, the potential target node generates a dedicated configuration to be used by the UE in case the CHO is executed. The source node decides the triggering conditions of measurement events (e.g. thresholds for A3, A5, etc.) and provides the triggering conditions and the potential target configuration to the UE.

The UE monitors CHO triggering conditions for all configured potential target cells. When a condition for a potential target cell is fulfilled, it executes a handover to that cell and sends an RRCReconfigurationComplete to the target node.

Dual Connectivity

Dual Connectivity (DC) allows two base stations, or access nodes, to simultaneously deliver user data to a UE. DC between LTE base stations was introduced in 3GPP Release-12, completed in March 2015, and DC-like aggregation of LTE and WLAN was introduced in 3GPP Release-13, completed in March 2016. In LTE-NR DC user data can be exchanged between a UE and an NR base station along with the LTE connectivity. The first solution to be standardized is Evolved—Universal Terrestrial Radio Access—New Radio dual connectivity—EN-DC.

In EN-DC, the master node (MN) is LTE, and the secondary, or aggregated, node (SN) is NR. In EN-DC, a UE has a second Radio Resource Control (RRC) termination at the secondary node, unlike LTE DC where there is only one RRC termination point—at the master node. The separation of LTE and NR RRC termination points enables the secondary node, depending on network configuration, to trigger the intra-NR mobility, that is, initiating secondary node change/release/modification. In LTE DC, only the master node was able to do this.

Multi-Radio Dual Connectivity (MR-DC), described in 3GPP TS 37.340 v.15.6.0, is a generalization of the Intra-E-UTRA Dual Connectivity (DC), where a multiple Rx/Tx UE may be configured to utilise resources provided by two different nodes connected via non-ideal backhaul, one providing NR access and the other one providing either E-UTRA or NR access. One node acts as the Master Node (MN) and the other as the Secondary Node (SN). The MN and SN are connected via a network interface and at least the MN is connected to the core network.

The Secondary Node Addition procedure is used to add a Secondary Cell Group for a UE. This procedure is specified in 3GPP TS 37.340, v.15.6.0, for EN-DC and MR-DC with 5GC as follows:

Secondary Node Addition Procedure for EN-DC

The Secondary Node Addition procedure is initiated by the MN and is used to establish a UE context at the SN to provide resources from the SN to the UE. For bearers requiring SCG radio resources, this procedure is used to add at least the first cell of the SCG. This procedure can also be used to configure an SN terminated MCG bearer (where no SCG configuration is needed). FIG. 7 shows the Secondary Node Addition procedure for EN-DC.

1. The MN decides to request the SN to allocate resources for a specific E-RAB, indicating E-RAB characteristics (E-RAB parameters, TNL address information corresponding to bearer type). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN always provides all the needed security information to the SN (even if no SN terminated bearers are setup) to enable SRB3 to be setup based on SN decision. In case of bearer options that require X2-U resources between the MN and the SN, the MN provides X2-U TNL address information for the respective E-RAB, X2-U DL TNL address information for SN terminated bearers, X2-U UL TNL address information for MN terminated bearers. In case of SN terminated split bearers the MN provides the maximum QoS level that it can support. The SN may reject the request.

NOTE 1: For split bearers, MCG and SCG resources may be requested of such an amount, that the QoS for the respective E-RAB is guaranteed by the exact sum of resources provided by the MCG and the SCG together, or even more. For MN terminated split bearers, the MNs decision is reflected in step 1 by the E-RAB parameters signalled to the SN, which may differ from E-RAB parameters received over S1.

NOTE 2: For a specific E-RAB, the MN may request the direct establishment of an SCG or a split bearer, i.e., without first having to establish an MCG bearer. It is also allowed that all E-RABs can be configured as SN terminated bearers, i.e. there is no E-RAB established as an MN terminated bearer.

2. If the RRM entity in the SN is able to admit the resource request, it allocates respective radio resources and, dependent on the bearer option, respective transport network resources. For bearers requiring SCG radio resources, the SN triggers Random Access so that synchronisation of the SN radio resource configuration can be performed. The SN decides the Pscell and other SCG Scells and provides the new SCG radio resource configuration to the MN in a NR RRC configuration message contained in the SgNB Addition Request Acknowledge message. In case of bearer options that require X2-U resources between the MN and the SN, the SN provides X2-U TNL address information for the respective E-RAB, X2-U UL TNL address information for SN terminated bearers, X2-U DL TNL address information for MN terminated bearers. For SN terminated bearers, the SN provides the S1-U DL TNL address information for the respective E-RAB and security algorithm. If SCG radio resources have been requested, the SCG radio resource configuration is provided.

NOTE 3: For the SN terminated split bearer option, the SN may either decide to request resources from the MN of such an amount, that the QoS for the respective E-RAB is guaranteed by the exact sum of resources provided by the MN and the SN together, or even more. The SNs decision is reflected in step 2 by the E-RAB parameters signalled to the MN, which may differ from E-RAB parameters received in step 1. The QoS level requested from the MN shall not exceed the level that the MN offered when setting up the split bearer in step 1.

NOTE 4: In case of MN terminated bearers, transmission of user plane data may take place after step 2.

NOTE 5: In case of SN terminated bearers, data forwarding and the SN Status Transfer may take place after step 2.

3. The MN sends to the UE the RRCConnectionReconfiguration message including the NR RRC configuration message, without modifying it.

4. The UE applies the new configuration and replies to MN with RRCConnectionReconfigurationComplete message, including a NR RRC response message, if needed. In case the UE is unable to comply with (part of) the configuration included in the RRCConnectionReconfiguration message, it performs the reconfiguration failure procedure.

5. The MN informs the SN that the UE has completed the reconfiguration procedure successfully via SgNB ReconfigurationComplete message, including the encoded NR RRC response message, if received from the UE.

6. If configured with bearers requiring SCG radio resources, the UE performs synchronisation towards the PSCell of the SN. The order the UE sends the RRCConnectionReconfigurationComplete message and performs the Random Access procedure towards the SCG is not defined. The successful RA procedure towards the SCG is not required for a successful completion of the RRC Connection Reconfiguration procedure.

7. In case of SN terminated bearers using RLC AM, the MN sends SN Status Transfer.

8. In case of SN terminated bearers using RLC AM, and dependent on the bearer characteristics of the respective E-RAB, the MN may take actions to minimise service interruption due to activation of EN-DC (Data forwarding).

9-12. For SN terminated bearers, the update of the UP path towards the EPC is performed.

2.1.7.2 Secondary Node Addition Procedure for MR-DC with 5GC

The Secondary Node (SN) Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 8 shows the SN Addition procedure with 5GC.

1. The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PScell and other SCG Scells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

2a. For SN terminated bearers using MCG resources, the MN provides Xn-U DL TNL address information in the Xn-U Address Indication message.

3. The MN sends the MN RRC reconfiguration message to the UE including the SN RRC configuration message, without modifying it.

4. The UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the encoded SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. In case of SN terminated bearers using RLC AM, the MN sends SN Status Transfer.

8. In case of SN terminated bearers using RLC AM, and dependent on the bearer characteristics of the respective QoS Flows, the MN may take actions to minimise service interruption due to activation of MR-DC (Data forwarding).

9-12. For SN terminated bearers, the update of the UP path towards the 5GC is performed via PDU Session Path Update procedure.

Secondary Node Change

Change of secondary node may be triggered in two ways, either by the Master Node or the Secondary node.

MN Initiated SN Change.

FIG. 9 shows an example signalling flow for the MN initiated Secondary Node Change:

1/2. The MN initiates the SN change by requesting the target SN to allocate resources for the UE by means of the SgNB Addition procedure. The MN may include measurement results related to the target SN. If forwarding is needed, the target SN provides forwarding addresses to the MN. The target SN includes the indication of the full or delta RRC configuration.

NOTE 2: The MN may send the SgNB Modification Request message (to the source SN) to request the current SCG configuration before step 1.

3. If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SgNB Release Request message triggers the source SN to stop providing user data to the UE and, if applicable, to start data forwarding.

4/5. The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

6. If the RRC connection reconfiguration procedure was successful, the MN informs the target SN via SgNBReconfigurationComplete message with the encoded NR RRC response message for the target SN, if received from the UE.

7. If configured with bearers requiring SCG radio resources, the UE synchronizes to the target SN.

8. For SN terminated bearers using RLC AM, the source SN sends the SN Status transfer, which the MN sends then to the target SN.

9. If applicable, data forwarding from the source SN takes place. It may be initiated as early as the source SN receives the SgNB Release Request message from the MN.

10. The source SN sends the Secondary RAT Data Volume Report message to the MN and includes the data volumes delivered to the UE over the NR radio for the related E-RABs.

NOTE 3: The order the SN sends the Secondary RAT Data Volume Report message and performs data forwarding with MN is not defined. The SN may send the report when the transmission of the related bearer is stopped.

11-15. If one of the bearer was terminated at the source SN, path update is triggered by the MN.

16. Upon reception of the UE Context Release message, the source SN can release radio and C-plane related resource associated to the UE context. Any ongoing data forwarding may continue.

SN Initiated SN Change.

FIG. 10 shows an example signalling flow for the Secondary Node Change initiated by the SN:

1. The source SN initiates the SN change procedure by sending SgNB Change Required message which contains target SN ID information and may include the SCG configuration (to support delta configuration) and measurement results related to the target SN.

2/3. The MN requests the target SN to allocate resources for the UE by means of the SgNB Addition procedure, including the measurement results related to the target SN received from the source SN. If forwarding is needed, the target SN provides forwarding addresses to the MN. The target SN includes the indication of the full or delta RRC configuration.

4/5. The MN triggers the UE to apply the new configuration. The MN indicates the new configuration to the UE in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

6. If the allocation of target SN resources was successful, the MN confirms the release of the source SN resources. If data forwarding is needed the MN provides data forwarding addresses to the source SN. If direct data forwarding is used for SN terminated bearers, the MN provides data forwarding addresses as received from the target SN to source SN. Reception of the SgNB Change Confirm message triggers the source SN to stop providing user data to the UE and, if applicable, to start data forwarding.

7. If the RRC connection reconfiguration procedure was successful, the MN informs the target SN via SgNB Reconfiguration Complete message with the encoded NR RRC response message for the target SN, if received from the UE.

8. The UE synchronizes to the target SN.

9. For SN terminated bearers using RLC AM, the source SN sends the SN Status transfer, which the MN sends then to the target SN.

10. If applicable, data forwarding from the source SN takes place. It may be initiated as early as the source SN receives the SgNB Change Confirm message from the MN.

11. The source SN sends the Secondary RAT Data Volume Report message to the MN and includes the data volumes delivered to the UE over the NR radio for the related E-RABs.

NOTE 4: The order the source SN sends the Secondary RAT Data Volume Report message and performs data forwarding with MN/target SN is not defined. The SgNB may send the report when the transmission of the related bearer is stopped.

12-16. If one of the bearer was terminated at the source SN, path update is triggered by the MN.

17. Upon reception of the UE Context Release message, the source SN can release radio and C-plane related resource associated to the UE context. Any ongoing data forwarding may continue.

2.1.8 PDCP (Packet Data Convergence Protocol) Protocol in LTE and NR

The PDCP (Packet Data Convergence Protocol) is a layer 2 protocol, operating between the UE and the access node (eNB or gNB) in 3GPP LTE and NR. The below introduction to PDCP is valid for both LTE and NR, when not stated otherwise, since they are similar.

The PDCP protocols for LTE and NR are specified in 3GPP TS 36.323, v.15.4.0 and 38.323, v.15.6.0, respectively.

Each Radio Bearer (i.e. DRB, SLRB and SRB, except for SRB0 and SRB1bis) is associated with one PDCP entity. Each PDCP entity is associated with one or two (one for each direction) RLC entities depending on the RB characteristic (i.e. uni-directional or bi-directional) and RLC mode.

A PDCP entity may be configured to perform IP header compression (ROHC). PDCP also performs ciphering and deciphering of user plane data and control plane data as well as integrity protection and integrity verification of control plane data. In addition, PDCP performs in-sequence delivery including data reordering, duplicate discard of data and also other functions, such as maintenance of PDCP sequence numbers (PDCP SNs, also known as COUNT).

In certain situations, such as after PDCP re-establishment and PDCP recovery, or when PDCP status reporting is triggered by other means (e.g. by the RRC layer or timer based polling in the PDCP layer itself), the PDCP entity transmits a PDCP Control PDU, known as the PDCP Status Report, to its peer PDCP entity. The content of the PDCP Status Report is the PDCP SN of the first missing PDCP SDU (corresponds to the field FMS in LTE and FMC in NR). The PDCP Status Report may also contain a Bitmap field where each bit represents a PDCP SDU. The size of the Bitmap field corresponds typically to the number of SDUs from and not including the first missing PDCP SDU up to and including the last out-of-sequence PDCP SDUs. Each bit indicates whether the SDU has been received (as indicated by the value '1') or not (as indicated by the value '0').

When the peer PDCP entity receives the PDCP Status Report, it considers the SDUs, and corresponding PDCP PDUs, with sequence number less than the FMS/FMC field, and also those with the bit in the Bitmap set to value '1', as successfully delivered and they are then discarded (known as SDU discard in NR and PDCP discard in LTE) in the transmitter buffer of this peer PDCP entity, and in the corresponding RLC entity in case they have been delivered to RLC.

It is in view of the above background and other considerations that the various embodiments of the present disclosure have been made.

An object of embodiments herein is to provide a mechanism that enables a target access node to know all downlink packets that have been received by a UE from a source access node in order to reduce packet duplication and free up downlink resources.

This general object has been addressed by the appended independent claims. Advantageous embodiments are defined in the appended dependent claims.

According to a first aspect, there is provided a method performed by a UE for handling PDCP SDUs when performing a DAPS handover of at least one radio bearer from a source access node to a target access node in a wireless communications network. The method comprises obtaining a trigger to perform the handover of said at least one radio bearer from the source access node to the target access node and establishing a radio connection for the at least one radio bearer with the target access node. The method further comprises switching an UL transmission of PDCP SDUs from the source access node to the target access node over the established radio connection and releasing a radio connection with the source access node. After that the radio connection with the source access node is released, the method comprises transmitting a PDCP status report to the target access node for each configured radio bearer of the at least one radio bearer, which respective PDCP status report indicates PDCP Sequence Numbers (SNs) of missing PDCP SDUs.

In some embodiments, the method further comprises transmitting a first PDCP status report, before releasing the radio connection with the source access node. The PDCP status report transmitted after releasing the radio connection with the source access node is a second PDCP status report.

In some embodiments, the method further comprises receiving, from the target access node, a message triggering the release of the radio connection with the source access node. The message triggering the release of the radio connection is any one out of a Radio Resource Control (RRC) Connection Reconfiguration message and a RRC Reconfiguration message.

In some embodiments, the PDCP status report is transmitted in any one out of: multiplexed with a RRC message, a message multiplexed with an RRC response message of a RRC "Release source cell" message, or inside this RRC response message, an RRC response message of a RRC "Release source cell" message multiplexed with a RRC Connection Reconfiguration Complete message, an RRC Reconfiguration Complete message, a PDCP Control PDU message, a Handover Completed Control PDU message, or together with a first transmitted UL data packet to the target access node.

In some embodiments, the PDCP status report is transmitted to the target access node for each Radio Link Control-Acknowledged Mode (RLC-AM) bearer configured to the UE.

According to a second aspect, there is provided a method performed by a target access node for handling PDCP SDUs during a DAPS handover of at least one radio bearer of a UE from a source access node to the target access node in a wireless communications network. The method comprises receiving, from the source access node, an indication that the handover of the at least one radio bearer of the UE is being performed and receiving, from the source access node, forwarded PDCP SDUs. The method further comprises receiving, from the UE, an indication that the UE has released a radio connection with the source access node and a PDCP status report for each configured radio bearer of the at least one radio bearer. The respective PDCP status report indicates PDCP SNs of missing PDCP SDUs. The method thereafter comprises discarding, based on the received PDCP status report, PDCP SDUs received from the source access node to avoid forwarding duplicated PDCP SDUs to the UE.

In some embodiments, the method further comprises receiving a first PDCP status report, which is received before the indication that the UE has released the radio connection with the source access node is received. The PDCP status report received in connection with the indication that the UE has released the radio connection with the source access node is a second PDCP status report.

In some embodiments, the method further comprises transmitting, to the UE, a message triggering the release of the radio connection with the source access node. The message is a RRC Connection Reconfiguration message or a RRC Reconfiguration message.

In some embodiments, the PDCP status report is received in any one out of: multiplexed with a RRC message, a message multiplexed with an RRC response message of a RRC "Release source cell" message, or inside this RRC response message, an RRC response message of a RRC "Release source cell" message multiplexed with a RRC Connection Reconfiguration Complete message, an RRC Reconfiguration Complete message, a PDCP Control PDU message, a Handover Completed Control PDU message, or together with a first transmitted UL data packet to the target access node.

In some embodiments, the PDCP status report is received for each RLC-AM bearer configured to the UE.

According to a third aspect, there is provided a UE configured to perform the method according to the first aspect.

The UE is configured to handle PDCP SDUs when performing a DAPS handover of at least one radio bearer from a source access node to a target access node in a wireless communications network. The UE being further configured to obtain a trigger to perform the handover of said at least one radio bearer from the source access node to the target access node and to establish a radio connection for the at least one radio bearer with the target access node. The UE being further configured to switch an UL transmission of PDCP SDUs from the source access node to the target access node over the established radio connection and to release a radio connection with the source access node. The UE is further configured to transmit a PDCP status report to the target access node for each configured radio bearer of the at least one radio bearer. The respective PDCP status report indicates PDCP SNs of missing PDCP SDUs.

In some embodiments, the UE further being configured to transmit a first PDCP status report, before the radio connection with the source access node is released. The PDCP status report transmitted after the radio connection with the source access node is released is a second PDCP status report.

In some embodiments, the UE further being configured to receive, from the target access node, a message triggering the release of the radio connection with the source access node. The message triggering the release of the radio connection is any one out of a RRC Connection Reconfiguration message and a RRC Reconfiguration message.

In some embodiments, the PDCP status report is transmitted in any one out of: multiplexed with a RRC message, a message multiplexed with an RRC response message of a RRC "Release source cell" message, or inside this RRC response message, an RRC response message of a RRC "Release source cell" message multiplexed with a RRC Connection Reconfiguration Complete message, an RRC Reconfiguration Complete message, a PDCP Control PDU message, a Handover Completed Control PDU message, or together with a first transmitted UL data packet to the target access node.

In some embodiments, the PDCP status report is transmitted to the target access node for each RLC-AM bearer configured to the UE.

According to a fourth aspect, there is provided a target access node configured to perform the method according to the second aspect.

The target access node is configured to handle PDCP SDUs during a DAPS handover of at least one radio bearer of a UE from a source access node to the target access node in a wireless communications network. The target access node being configured to receive, from the source access node, an indication that the handover of the at least one radio bearer of the UE is being performed and to receive, from the source access node, forwarded PDCP SDUs. The target access node is further configured to receive, from the UE, an indication that the UE has released a radio connection with the source access node and a PDCP status report for each configured radio bearer of the at least one radio bearer. The respective PDCP status report indicates PDCP SNs of missing PDCP SDUs. Thereafter, the target access node is configured to discard PDCP SDUs received from the source access node based on the received PDCP status report to avoid forwarding duplicated PDCP SDUs to the UE.

In some embodiments, the target access node further being configured to receive a first PDCP status report, which is received before the indication that the UE has released the radio connection with the source access node. The PDCP status report received in connection with the indication that the UE has released the radio connection with the source access node is a second PDCP status report.

In some embodiments, the target access node further is configured to transmit a message, to the UE, to trigger the release of the radio connection with the source access node. The message is a RRC Connection Reconfiguration message or a RRC Reconfiguration message.

In some embodiments, the PDCP status report is any one out of: multiplexed with a RRC message, a message multiplexed with an RRC response message of a RRC "Release source cell" message, or inside this RRC response message, an RRC response message of a RRC "Release source cell" message multiplexed with a RRC Connection Reconfiguration Complete message, an RRC Reconfiguration Complete message, a PDCP Control PDU message, a Handover Completed Control PDU message, or together with a first transmitted UL data packet to the target access node.

In some embodiments, the PDCP status report is received for each RLC-AM bearer configured to the UE.

According to a fifth aspect, there is provided a computer program comprising instructions which, when executed on at least one processor, cause the at least one processor to carry out the method according to the first and/or second aspect.

According to a sixth aspect, there is provided a carrier comprising the computer program of the fifth aspect, wherein the carrier is one of an electronic signal, optical signal, radio signal or computer readable storage medium.

The various proposed embodiments herein provide an improved handling of PDCP SDUs during DAPS handovers. Embodiments provided herein may reduce packet duplication and free up downlink resources. In addition, the delay of downlink packets may be reduced.

The embodiments herein are not limited to the features and advantages mentioned above. A person skilled in the art will recognize additional features and advantages upon reading the following detailed description.

BRIEF DESCRIPTION OF THE DRAWINGS

Embodiments will now be described in more detail in relation to the enclosed drawings, in which:

FIG. 18 is a flowchart depicting embodiments of a method in a communications system comprising a host computer, a base station and a UE;
FIG. 19 is a comprising depicting embodiments of a method in a communications system comprising a host computer, a base station and a UE.

DETAILED DESCRIPTION

As a part of developing embodiments herein, the inventors identified a problem which first will be discussed.

Figure 1:
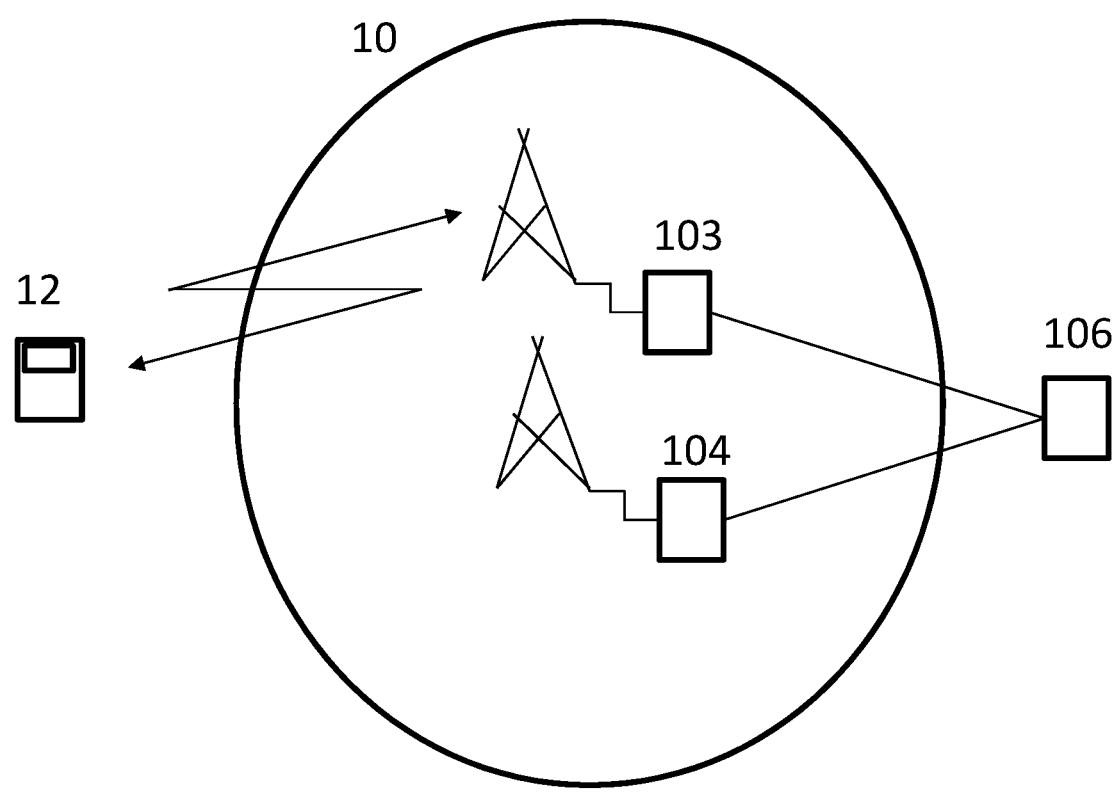
FIG. 1 is a schematic overview depicting a wireless communications network.
Figure 2:
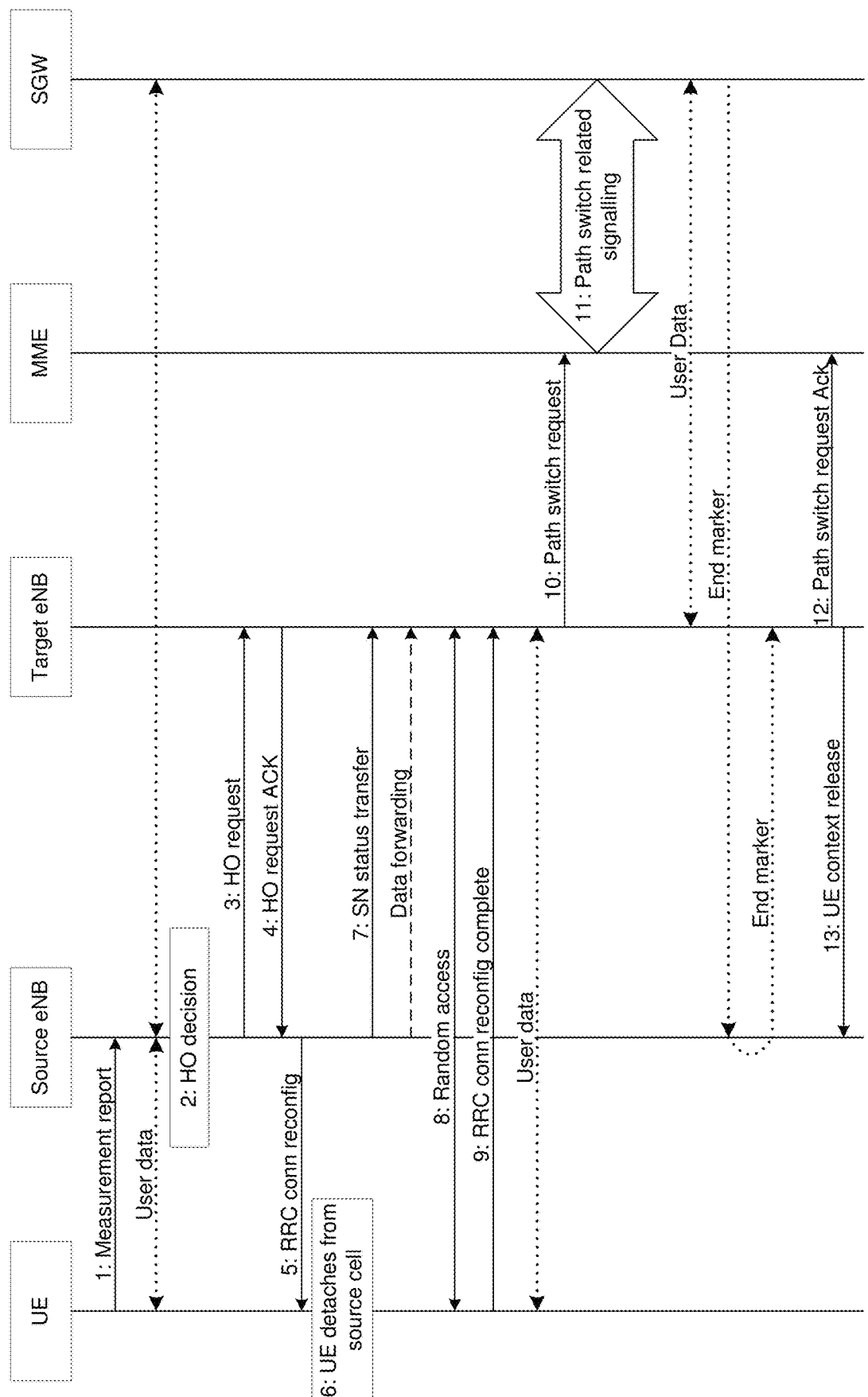
FIG. 2 illustrates a handover in LTE.
Figure 3:
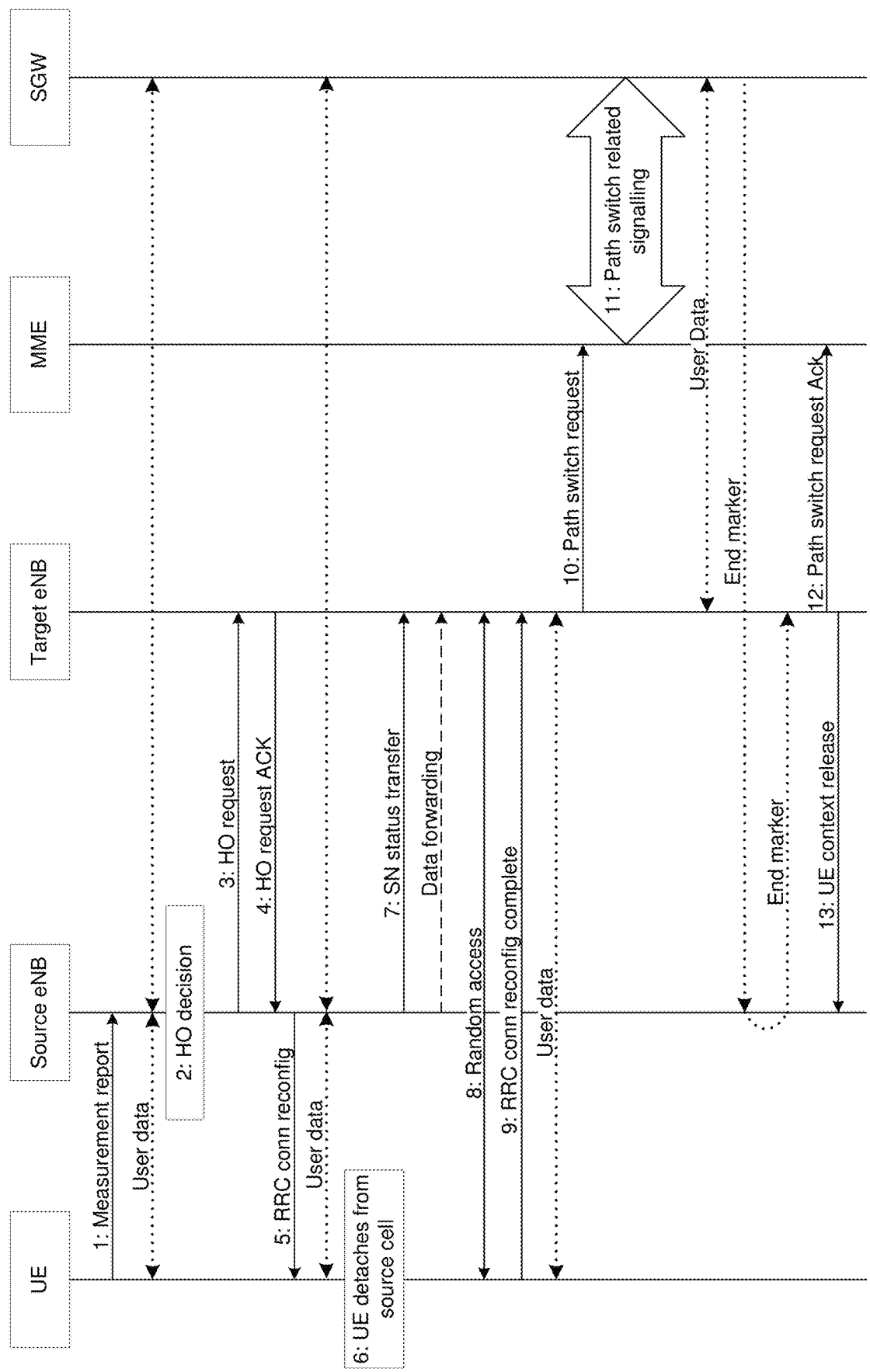
FIG. 3 shows a Rel-14 LTE Make Before Break handover.
Figure 4:
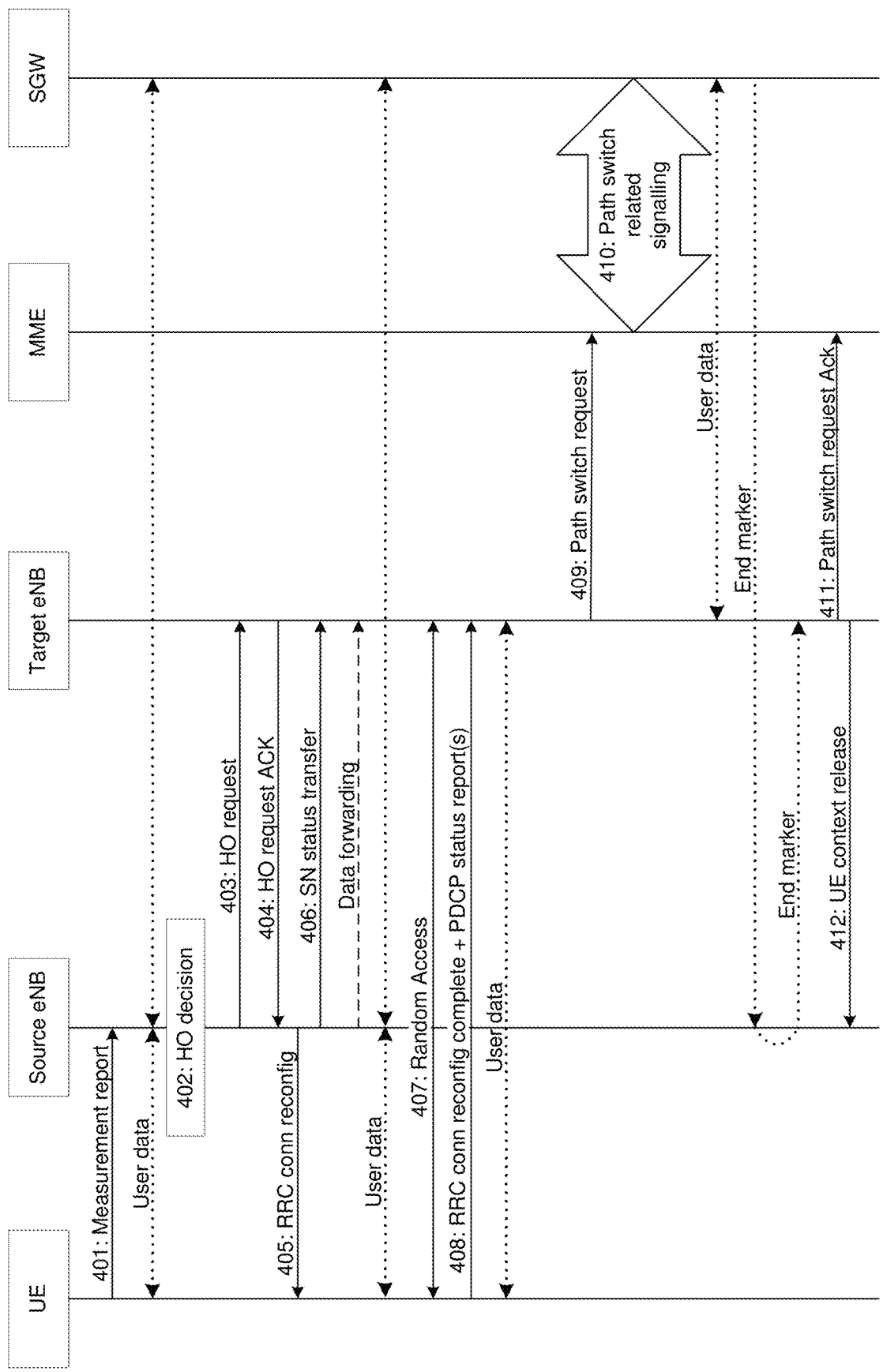
FIG. 4 is an example of an Enhanced Make-Before-Break inter-node handover.
Figure 5:
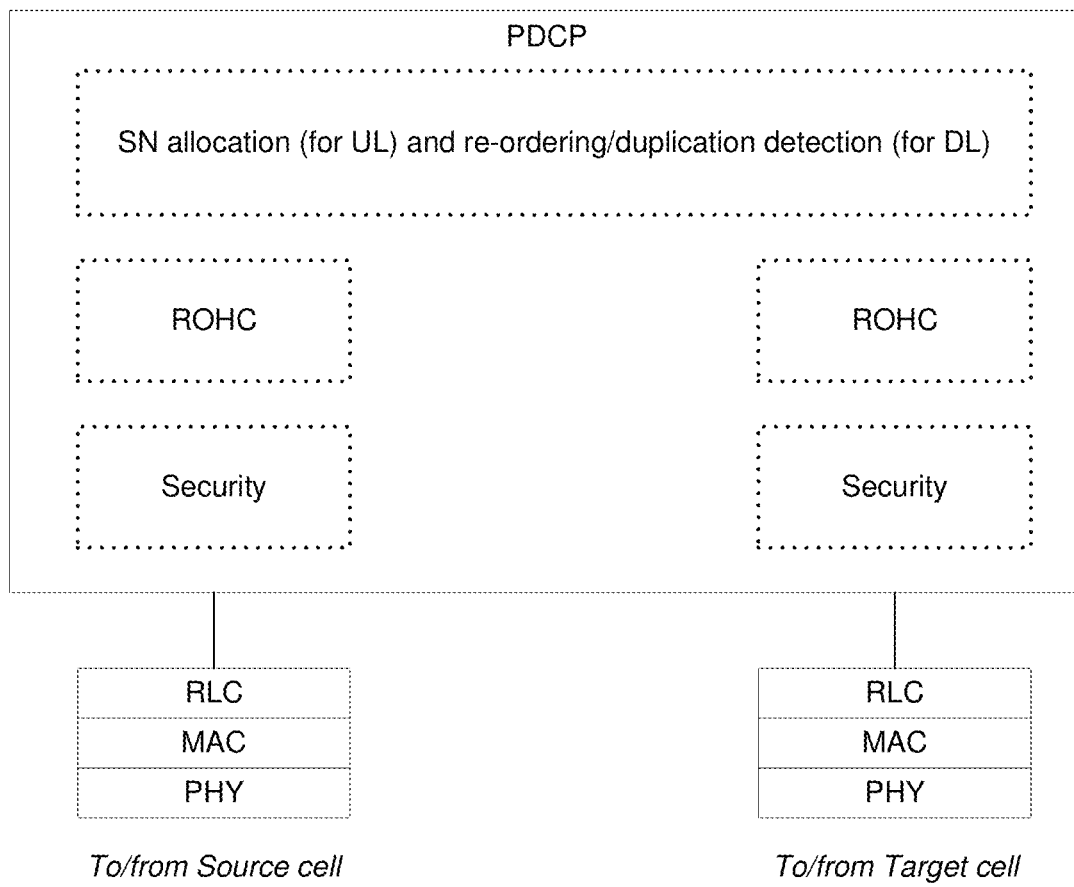
FIG. 5 shows the protocol stack at the UE side in Enhanced Make-Before-Break.
Figure 6:
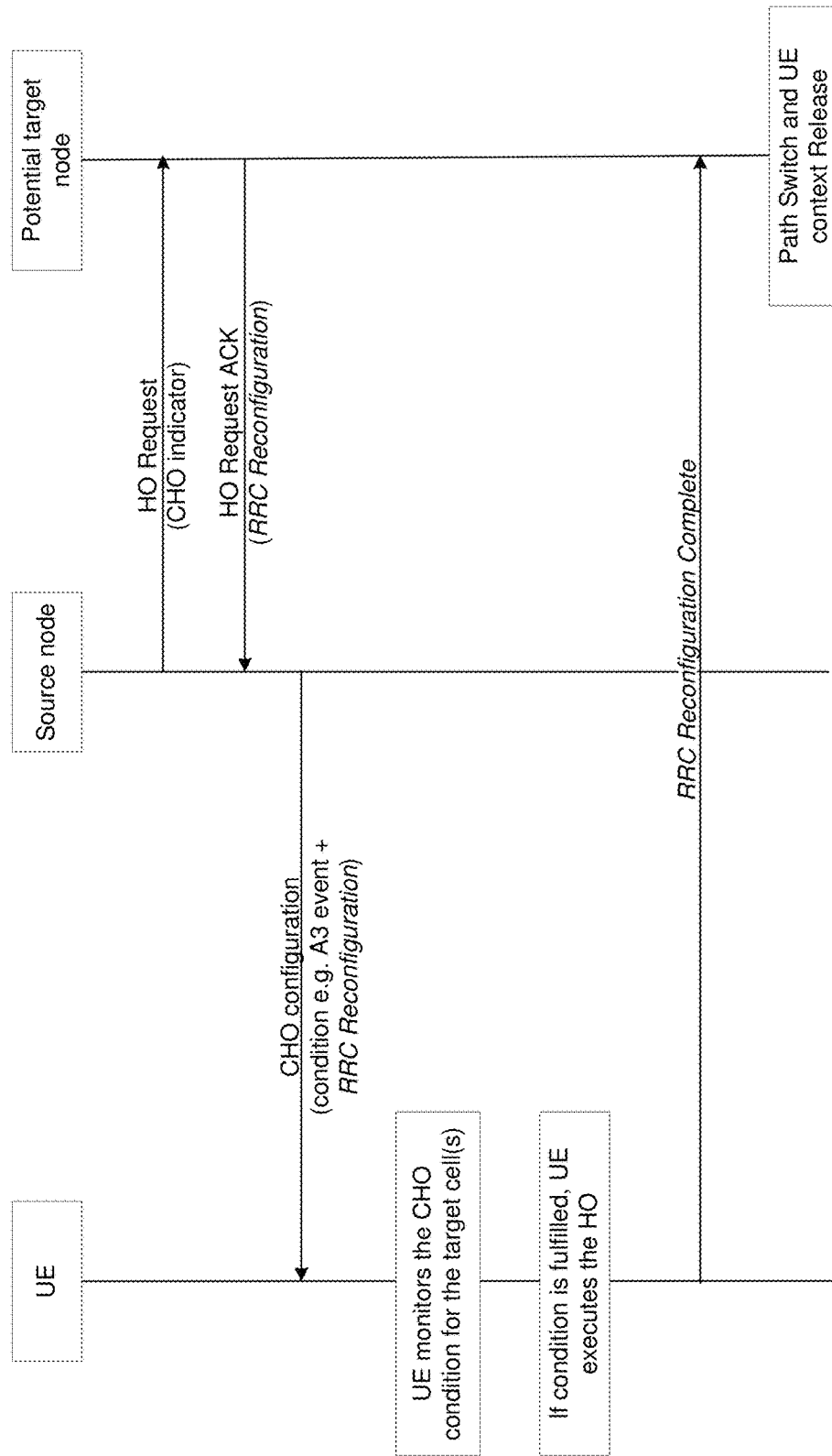
FIG. 6 illustrates the principle for a conditional handover procedure.
Figure 7:
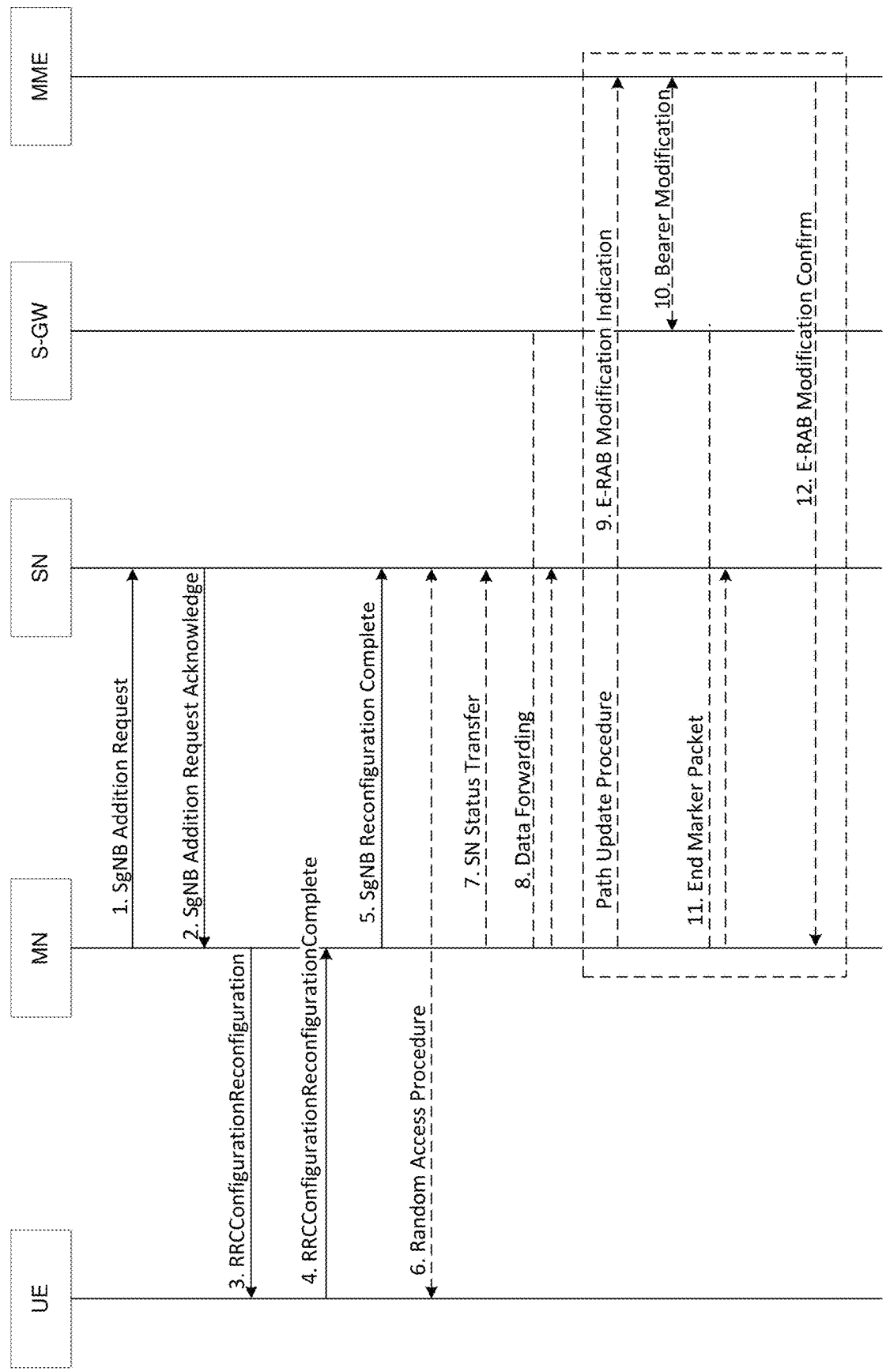
FIG. 7 shows a Secondary Node Addition procedure for EN-DC.
Figure 8:
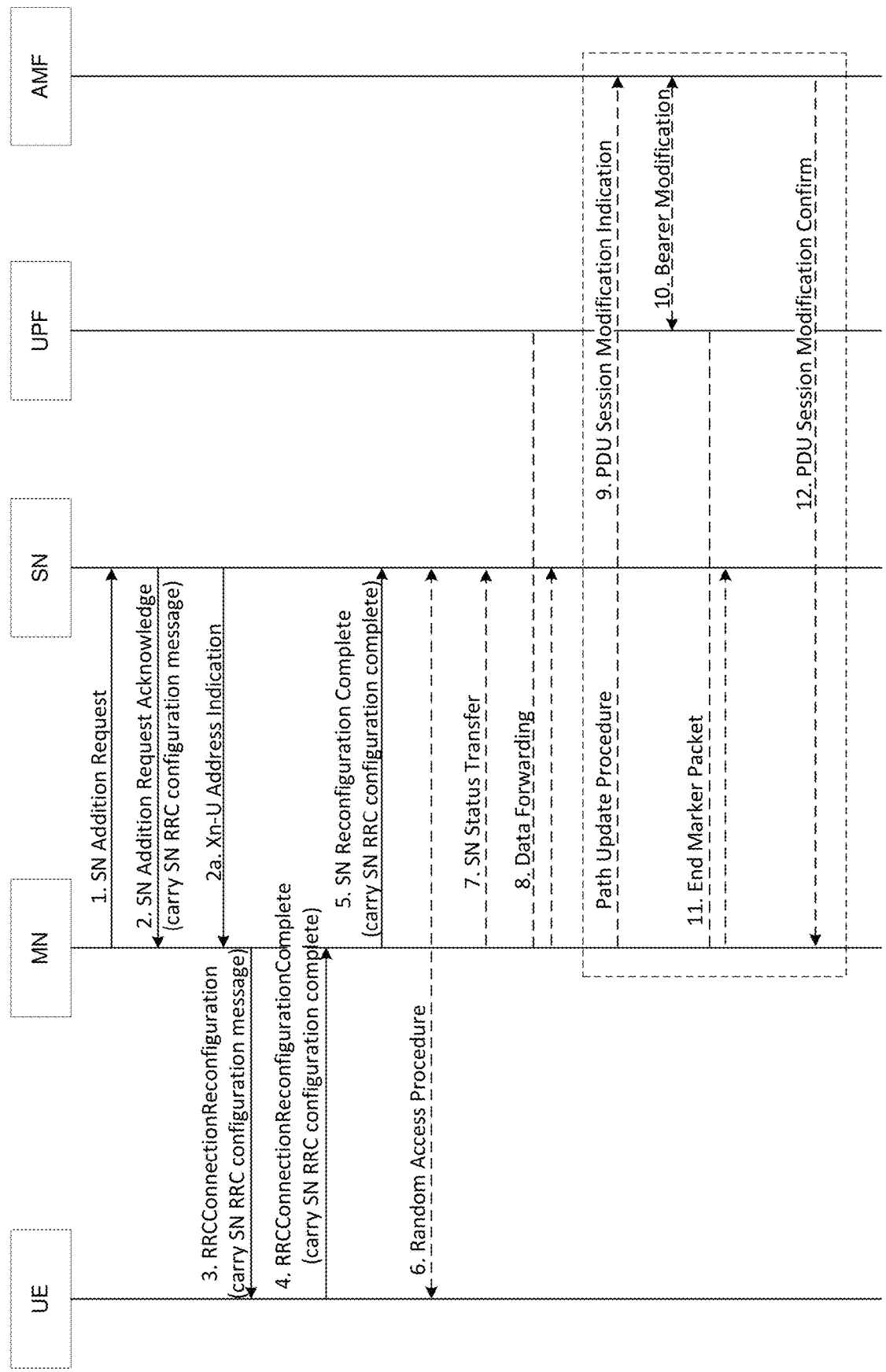
FIG. 8 shows a Secondary Node Addition procedure with SGC.
Figure 9:
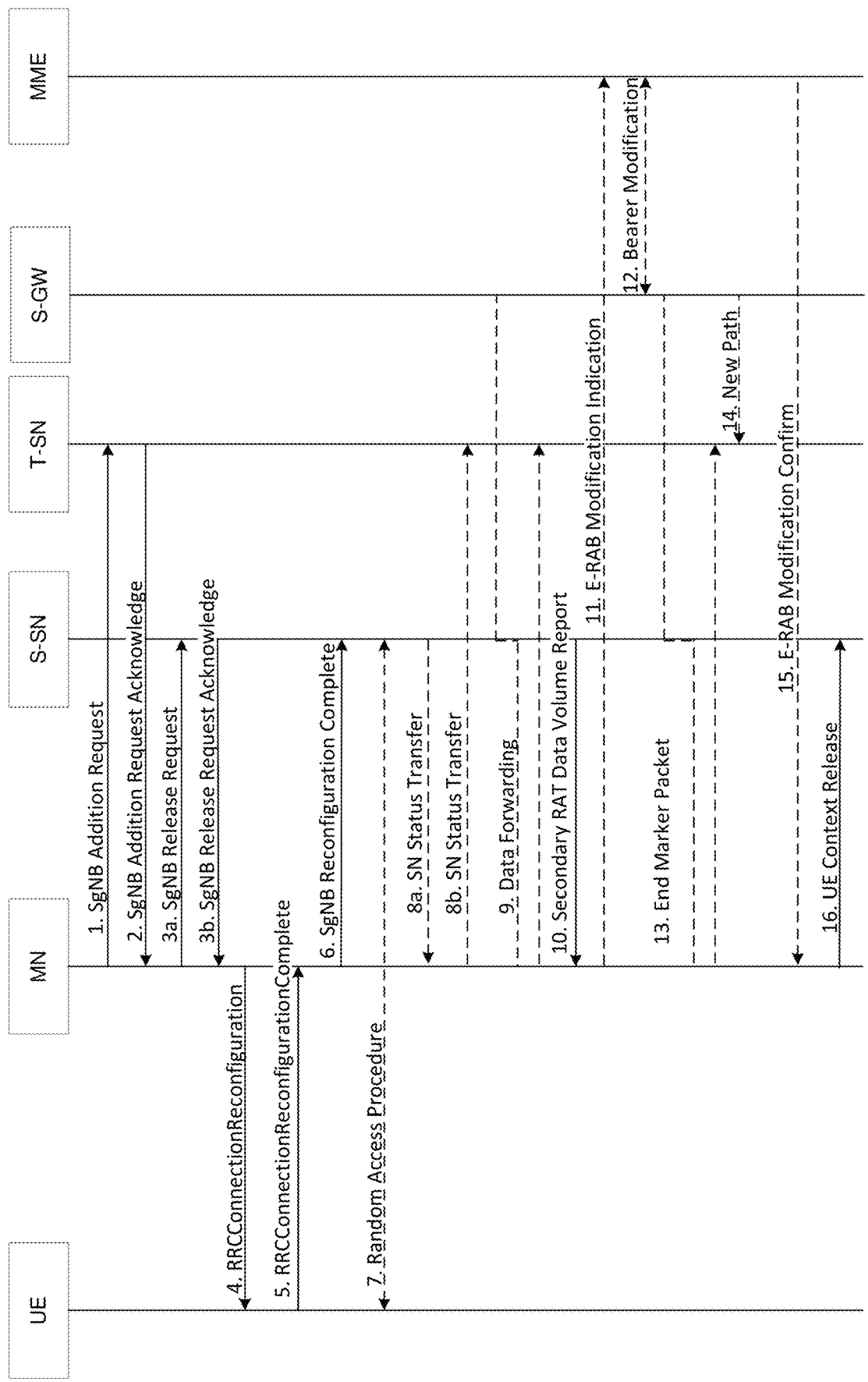
FIG. 9 shows an example signaling flow for a Master Node initiated Secondary Node Change.
Figure 10:
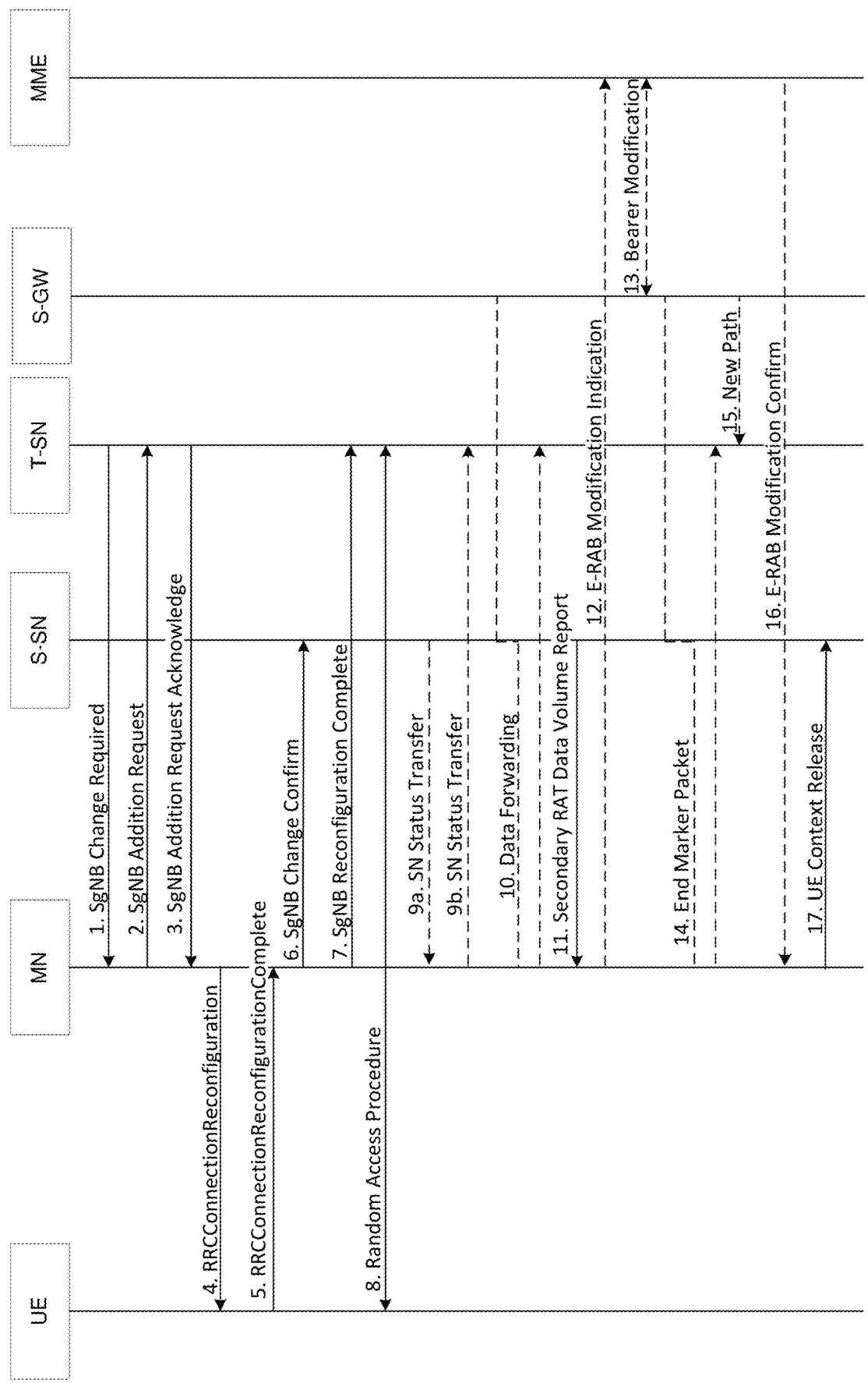
FIG. 10 shows an example signaling flow for a Secondary Node Change initiated by the Secondary Node.

In the enhanced make-before-break solution depicted in FIG. 4, after having sent the handover command message to the User Equipment (UE), in order to avoid packet loss, it has been proposed that the source access node will forward all DownLink (DL) data packets to the target access node. In step 408, the UE transmits one or more Packet Data Convergence Protocol (PDCP) status reports, one for each Radio Link Control-Acknowledged Mode (RLC-AM) bearer configured to the UE, together with the Handover Complete message, indicating the last received PDCP Sequence Number (SN) in the source cell, or rather the PDCP SN of the first missing PDCP Service Data Unit (SDU), for each bearer. Based on the information in the PDCP status report(s), the target access node then sends the forwarded packets to the UE and in the same time avoids sending duplicate PDCP packets, i.e. PDCP packets which were already received by the UE in the source cell. However, the forwarding of packets over X2/ Xn causes a delay and considering that after step 408, the UE continues to receive DL data packets also from the source access node, the UE may receive one or more DL packets from the source access node, which is/are also forwarded to the target access node. Due to delays caused by the inter access node link (X2/ Xn interface), the UE would receive the packet(s) from source access node typically earlier than the same packet(s) is received from the target access node.

However, the target access node is not aware of any DL packets received by the UE from the source access node after having received the PDCP status report(s) from the UE in step 408. This means that the target access node may send the same packets to the UE as were received by the UE from the source access node, i.e. the DL packets sent from the target access node will be treated as duplicated packets in the UE, introducing delay for subsequent DL packets and thus a jitter in the DL data stream.

Figure 11:
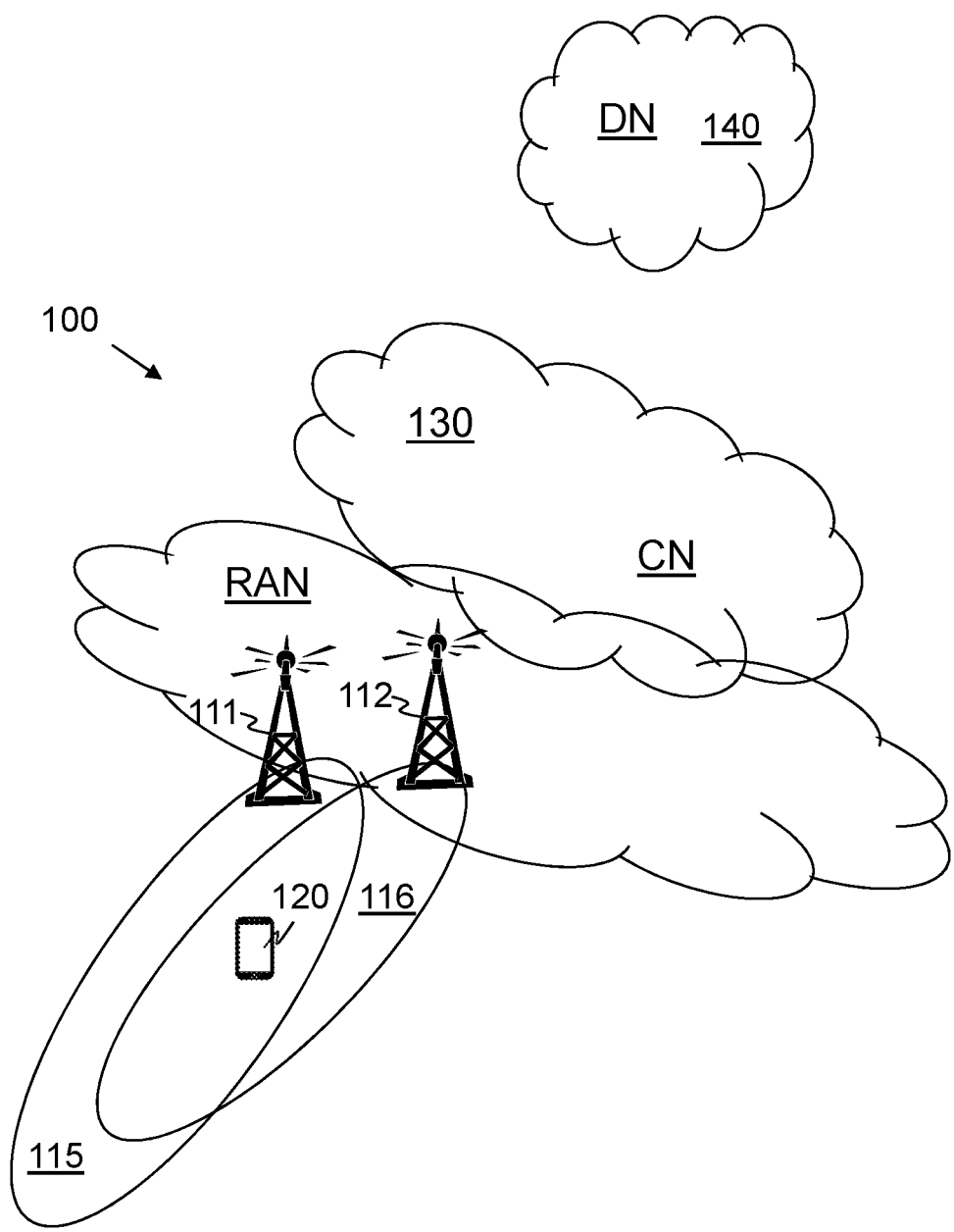
FIG. 11 is a schematic overview depicting a wireless communications network.

Embodiments herein relate to wireless communication networks in general. FIG. 11 is a schematic overview depicting a wireless communications network 100 wherein embodiments herein may be implemented. The wireless communications network 100 comprises one or more Radio Access Networks (RANs) and one or more Core Networks (CNs). The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Access nodes operate in the wireless communications network 100 such as a source access node 111 and a target access node 112. The source access node 111 provides radio coverage over a geographical area, a service area referred to as a source cell 115, which may also be referred to as a beam or a beam group of a first radio access technology (RAT), such as 5G, LTE, Wi-Fi or similar. The target access node 112 also provides radio coverage over a geographical area, a service area referred to as a target cell 116, which may also be referred to as a beam or a beam group of a first RAT, such as 5G, LTE, Wi-Fi or similar. The first and second access nodes 111, 112 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the respective source and target access node 111, 112 depending e.g. on the first RAT and terminology used. The respective source and target access node 111, 112 may be referred to as serving radio access nodes and communicates with a UE with DL transmissions to the UE and UpLink (UL) transmissions from the UE.

A number of UEs operate in the wireless communication network 100, such as a UE 120. The UE 120 may be a mobile station, a non-access point (non-AP) STA, a STA, a user equipment and/or a wireless terminal, that communicate via one or more Access Networks (AN), e.g. RAN, e.g. via the source and/or target access nodes 111, 112 to one or more CN e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in a first aspect be performed by the UE 120 and in a second aspect by the target access node 112. As an alternative, a Distributed Node (DN) and functionality, e.g. comprised in a cloud 140 as shown in FIG. 11, may be used for performing or partly performing the methods.

In some examples of the embodiments herein, the UE 120 transmits a PDCP status report, or rather, one PDCP status report for each RLC-AM bearer configured to the UE 120, to the target access node 112 after having released the connection to the source cell. In this way, the target access node 112 becomes aware of any additional DL packets received by the UE 120 from the source access node 111 after having sent a HO complete and the PDCP Status Report to the target access node 112, thus the target access node 112 can avoid sending duplicate DL packets to the UE 120.

It should be noted that a handover according to embodiments herein also comprises a secondary node change.

Embodiments herein enable the target access node 112 to know all DL packets that have been received by the UE 120 from the source access node 111, also such packets that were received after the UE 120 connected to the target cell and sent HO complete. This reduces packet duplication and frees up downlink resources. In addition, the delay of downlink packets is reduced.

In certain embodiments herein, in particular in scenarios when the downlink from the source access node 111 is still good, forwarding of downlink packets from source access node 111 to target access node 112 may be started later.

Figure 12:
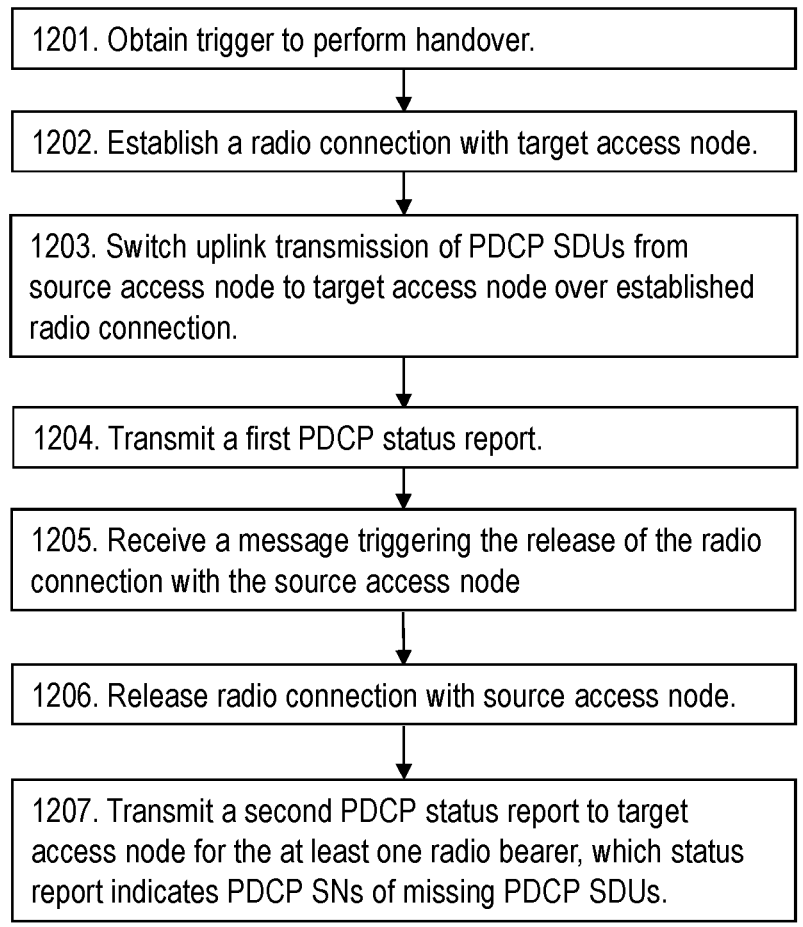
FIG. 12 is a flow chart according to embodiments herein.

FIG. 12 shows an example embodiment of a method performed by the UE 120 for handling PDCP SDUs when performing a Dual Active Protocol Stack (DAPS) handover of one or more radio bearers from a source access node 111 to a target access node 112 in a wireless communications network 100. The wording Secondary node change may also be referred to as a handover herein.

The method will first be described in brief, thereafter in more detail. The method comprises one or more of the following actions.

In Action 1201, the UE 120 is triggered to perform the handover. The UE 120 is triggered to perform the handover of said at least one radio bearer from the source access node 111 to the target access node 112 by obtaining a trigger. Thereafter, in Action 1202, the UE 120 establishes a radio connection for the at least one radio bearer with the target access node 112. In Action 1203, after establishing a radio connection for the radio bearers with the target access node 112, the UE 120 switches an uplink (UL) transmission of PDCP SDUs, from the source access node 111 to the target access node 112 over the established connection.

In Action 1206, the UE 120 releases a radio connection with the source access node 111. After releasing a radio connection with the source access node 111, in Action 1206, the UE 120 transmits in Action 1207, a status report, e.g. a PDCP status report, to the target access node 112, for each configured radio bearer out of the one or more radio bearers. The respective status report indicates which PDCP SDUs that have been received by any one or more out of: the source access node 111 or the target access node 112. Expressed differently, the respective PDCP status report indicates PDCP SNs of missing PDCP SDUs.

The method actions in the UE 120 will now be described and exemplified in more detail in the below text.

Action 1201: The UE 120 obtains a trigger to perform a handover of the at least one radio bearer from the source access node 111 to the target access node 112. Accordingly, the UE 120 is triggered to perform a handover to the target access node 112. The trigger may be reception of a handover command triggering message or Secondary node change triggering message, such as RRCConnectionReconfiguration in LTE or RRCReconfiguration in NR, to perform enhanced make-before-break handover/SCG change or a UE-internal trigger, such that a condition for performing a conditional handover is fulfilled. The type of handover towards the target access node may be a DAPS handover, i.e. an enhanced make-before-break handover.

Action 1202: The UE 120 establishes a radio connection with the target access node 112, typically using a random access procedure.

Action 1203: At a certain point, such as reception of the first UL grant from the target access node 112, the UE 120 switches its uplink transmission of PDCP SDUs from a source cell provided by the source access node 111 to a target cell provided by the target access node 112. As the handover is of enhanced make-before-break type, i.e. a DAPS handover, the UE 120 keeps the radio connection with the source access node 111 and may therefore continue to receive DL packets from the source access node 111 also after having switched the UL user data transmission to the target access node 111. The UE 120 typically transmits a handover complete type of message or Secondary node change complete type of message, such as RRCConnectionReconfigurationComplete in LTE or RRCReconfigurationComplete in NR, to the target access node 112. From this point in time, the UE 120 may receive DL packets from both the source access node 111 and the target access node 112.

Action 1204: In some embodiments, the UE 120 transmits a first status report, before releasing the radio connection with the source access node 112. The PDCP status report transmitted after releasing the radio connection with the source access node 111 is then referred to as a second PDCP status report.

Action 1205: In some embodiments, the UE 120 may receive a message triggering the release of the radio connection with the source access node 112. Examples of such messages may be a RRCConnectionReconfiguration message from the target access node 112, or a RRCReconfiguration message from the target access node in NR.

Action 1206: The UE 120 releases the radio connection with the source access node 111. The release of the source cell may be triggered by a message received from the source or target access node or from an in-band indicator, e.g. a PDCP "end marker" packet, received from the source access node 111 or that a certain condition in the UE 120 is fulfilled, such as a timer has expired, a timer which typically is started at completion of the random access procedure or at reception of the handover command. The release of the source connection may also be done implicitly by the UE 120, e.g. at expiry of an inactivity timer or at detection of a radio link failure.

Action 1207: After the UE 120 has released the source cell connection, it transmits a PDCP status report to the target access node 112 for each radio bearer. Thus, the step 1207 of transmitting the PDCP status report is performed after that the UE 120 has released the source cell connection. The UE 120 transmits a PDCP status report, to the target access node 112, for each configured radio bearer out of the at least one or more radio bearer. Preferably, one PDCP status report is transmitted for each RLC-AM bearer configured to the UE 120. This PDCP status report indicates which SDUs that have been received in the source cell, or rather the PDCP SN of the first missing PDCP SDU. Alternatively, the PDPC status report indicates which SDUs, that have been received, or rather the PDCP SN of the first missing PDCP SDU, in either the source or the target cell.

In some alternative embodiments, in Action 1206, the UE 120 sends a message to the target access node 112 to indicate that it has released the source cell connection, for example a new "Source cell connection released" RRC message. In this alternative, the PDCP status report is sent from the UE 120 as a message multiplexed with this RRC message or alternatively sent inside this RRC message.

In some other alternative embodiments, in Action 1206, the UE 120 releases the source cell connection when a certain message is received from the target access node 112, such as a new RRC "Release source cell" message. In this alternative, the PDCP status report may be sent from the UE 120 as a message multiplexed with the RRC response message of the RRC "Release source cell" message, or alternatively sent inside this RRC message.

In some other alternative embodiments, the UE 120 releases the source cell connection, in Action 1206, when receiving the RRCConnectionReconfiguration message from the target access node 112, in NR, RRCReconfiguration message. This indication may be received in Action 1205. In this alternative, the PDCP Status Report is sent from the UE 120 multiplexed with the RRCConnectionReconfigurationComplete message, in NR, RRCReconfigurationComplete message.

In some other alternative embodiments, in Action 1207, instead of transmitting a PDCP Status Report, the UE 120 transmits a new type of PDCP Control PDU, such as Handover Completed Control PDU. This Handover Completed Control PDU may be then identified by the target access node 112 as a signal that the UE 120 has released the source cell connection, as it is different from the PDCP Status Report Control PDU. The content of the Handover Completed Control PDU may be, in one alternative, the same as the content of the PDCP Status Report Control PDU.

In some other alternative embodiments, in Action 1206, when the radio connection with the source access node 111 is released implicitly by the UE 120 or the release is triggered by an in-band indicator, e.g. a PDCP "end marker" packet, received from the source access node 111, the PDCP Status Report is sent together with the first transmitted UL data packet to the target access node 112.

In some other alternative embodiments, the UE 120 sends, in Action 1204, a first PDCP Status Report (per bearer) together/multiplexed with the RRCConnectionReconfigurationComplete message (in LTE) or RRCReconfigurationComplete message (in NR) which constitutes the "Handover Complete" indication. If the DL PDCP SN status changes, i.e. if the UE 120 successfully receives one or more additional DL PDCP packets from the source node, before the UE 120 has released the DL connection in the source cell, the UE 120 sends a second PDCP status report, or a message containing equivalent information, for the concerned bearer (s) and possibly a third, etc. There may be several alternatives for how/when to transmit the additional PDCP status report(s).

1. Immediately when an additional DL PDCP packet is received from the source node 111. The UE 120 may use a new message or type of message, possibly with no other purpose than conveying the PDCP status report/information.

Optionally, a PDCP status report (or equivalent information) may be sent after every received additional DL PDCP packet from source node 111. As an additional option, rate limitation may be applied to the transmissions of PDCP status reports/information, e.g. such that a PDCP status report (or equivalent information) cannot be sent, unless at least the time T has elapsed since the last PDCP status report/information (possibly for the same bearer) was sent to the target node. T may be configurable/configured, standardized or left to UE implementation.

2. When and/or if the UE 120 receives a certain number N of additional DL PDCP packets from the source access node 111. As above, the UE 120 may use a new message or type of message, possibly with no other purpose than conveying the PDCP status report/information.

As one option, N is configurable, e.g. using the handover-triggering RRC message, i.e. an RRCConnectionReconfiguration message in LTE or an RRCReconfiguration message in NR, or via the system information or using some other message or protocol. If the handover-triggering RRC message is used, either the target node or the source node may configure N.

As another option, N is a UE implementation choice.

As yet another option, N is specified in standard specification(s).

Optionally, a PDCP status report (or equivalent information) may be sent after every Nth received additional DL PDCP packet from source node. As an additional option, rate limitation may be applied to the transmissions of PDCP status reports/information, e.g. such that a PDCP status report (or equivalent information cannot be sent, unless at least the time T has elapsed since the last PDCP status report/information (possibly for the same bearer) was sent to the target node. T may be configurable/configured, standardized or left to UE implementation.

3. When the UE 120 releases the DL connection in the source cell. With this alternative, the UE 120 may use any of the previously described means/messages for conveying the PDCP status report/information in conjunction with the source cell release.

4. As alternative 1 or 2, and also transmitting a PDCP status report (or equivalent information) when the UE 120 releases the DL connection in the source cell, if any further DL PDCP packet(s) has/have been received from the source access node 111 since the last PDCP status report was sent to the target access node 112.

5. As 1 or 2, and also transmitting a PDCP status report (or equivalent information) when the UE 120 receives the RRCConnectionReconfiguration message (in LTE) or RRCReconfiguration message (in NR) from the target access node 112, if any further DL PDCP packet(s) has/have been received from the source access node 111 since the last PDCP status report. The PDCP status report (or equivalent information) would be transmitted with the RRCConnectionReconfigurationComplete message (in LTE) or the RRCReconfigurationComplete message (in NR).

6. Together with (e.g. included/piggybacked/multiplexed) every (or any, at the choice of the UE) UL packet the UE 120 sends in the target cell, if the PDCP SN status has changed (i.e. if the UE has received one or more additional DL PDCP packet(s) from the source access node 111) since the UE 120 sent the last PDCP status report/information to the target access node 112.

7. Together with (e.g. included/piggybacked/multiplexed) every Nth UL packet the UE sends in the target cell, if the PDCP SN status has changed (i.e. if the UE 120 has received one or more additional DL PDCP packet(s) from the source access node 111) since the UE 120 sent the last PDCP status report/information to the target access node 112. N may be configurable/configured, standardized or left to UE implementation.

8. Together with (e.g. included/piggybacked/multiplexed) an UL packet the UE 120 sends in the target cell, provided that the UE 120 has received at least N DL PDCP packets from the source access node 111 since the UE 120 sent the last PDCP status report/information to the target access node 112. N may be configurable/configured, standardized or left to UE implementation.

A possible option when the UE 120 sends multiple PDCP status reports, or multiple instances of PDCP status information, may be to send compressed PDCP status information in the form of delta-information, i.e. only including the changes since the last sent PDCP status report/information.

A variation of the above alternative embodiment is that the first PDCP status report to the target access node 112 is not sent with the RRCConnectionReconfigurationComplete message (in LTE) or RRCReconfigurationComplete message (in NR) which constitutes the "Handover Complete" indication. Instead, the first PDCP status report may be sent at any time before the UE 120 releases the downlink in the source cell, either as a separate message or together with (e.g. included/piggybacked/multiplexed) another uplink packet. The rest would follow the principles of the above alternative embodiment, including all possible options, alternatives and variations.

Figure 13:
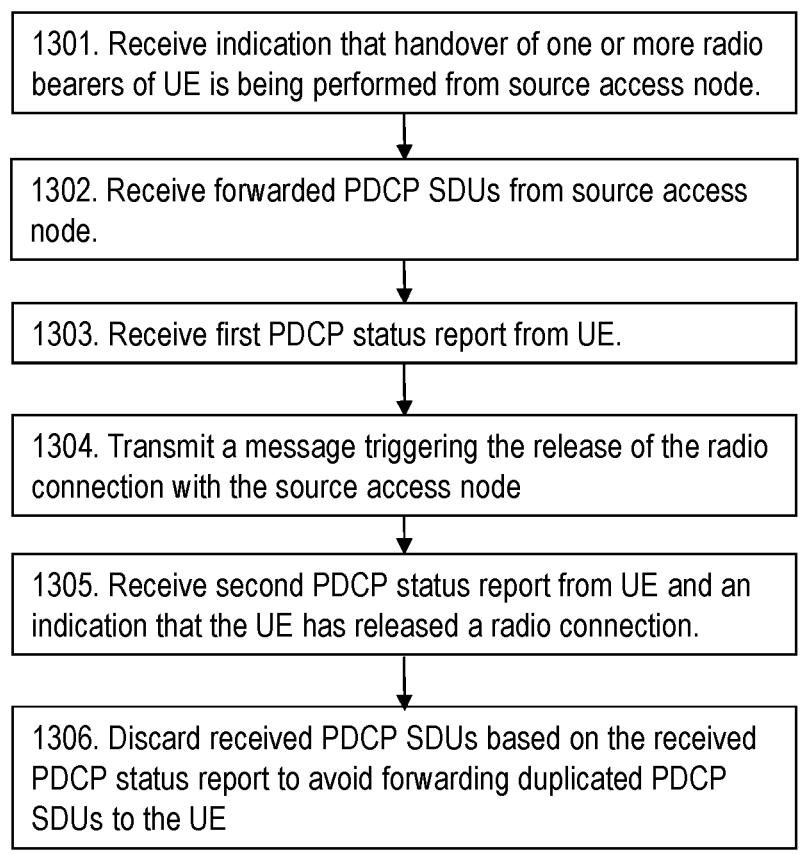
FIG. 13 is a flow chart according to embodiments herein.

FIG. 13 shows an example method performed by a target access node 112 for handling PDCP SDUs during a DAPS handover of one or more radio bearers of a UE 120 from a source access node 111 to the target access node 112 in a wireless communications network 100.

The method will first be described in brief, thereafter in more detail. The method comprises one or more of the following actions.

In Action 1301, the target access node 112 receives from the source access node 111, an indication that the handover of the one or more radio bearers of the UE 120 is being performed.

The target access node 112 further receives from the source access node 111 in Action 1302, forwarded PDCP SDUs.

In Action 1305, the target access node 112, receives from the UE 120, a status report, e.g. a PDCP status report, for each configured radio bearer out of the one or more radio bearers. The respective status report indicates which PDCP SDUs that have been received by any one or more out of: the source access node 111 or the target access node 112, and an indication that the UE 120 has released a radio connection with the source access node 111. The respective status report indicates PDCP SNs of missing PDCP SDUs.

The target access node 112 then discards, in Action 1306, received duplicated PDCP SDUs that are to be forwarded to the UE 120. The target access node 112 discards, based on the received PDCP status report, PDCP SDUs received from the source access node 111 to avoid forwarding duplicated PDCP SDUs to the UE 120. Thus, based on the received PDCP status report, the target access node 112 may determine which PDCP SDUs that already have been transmitted to the UE 120 by the source access node 111. These PDCP SDUs are discarded and thus not forwarded to the UE 120.

The methods in the target access node 112 will now be described and exemplified in more detail in the below text.

Action 1301: The target access node 112 obtains an indication, such as a handover request message from the source access node 111, that an enhanced make-before break handover/SCG change of UE 120 is being performed from a source access node 111 to this node.

Action 1302: In order to ensure lossless handover in the DL, the source access node 111 forwards the DL PDCP SDUs stored in the retransmission buffer as well as fresh DL PDCP SDUs received from the gateway to the target access node 112 for (re-) transmission. The target access node 112 receives those forwarded data packets from the source access node 111.

Action 1303: In some embodiments, the target access node 112 receives a first PDCP status report, which is received before the indication that the UE 120 has released the radio connection with the source access node 111 is received. The PDCP status report received in connection with the indication that the UE 120 has released the radio connection with the source access node 111 is then referred to as a second PDCP status report.

Action 1304: In some embodiments, the target access node 112 transmits, to the UE 120, a message triggering the release of the radio connection with the source access node 111. The message may be a RRC Connection Reconfiguration message (in LTE) or a RRC Reconfiguration message (in NR).

Action 1305: The target access node 112 receives a PDCP status report, or one PDCP Status Report for each configured radio bearer, from the UE 120 and an indication that the UE 120 has released the source cell connection. In one alternative, this indication is an RRC message such as a new type of RRC message, for example "Source cell connection released" RRC message.

In another alternative, this indication is an RRC response message of a new RRC "Release source cell" message.

In yet another alternative, this indication is the RRCConnectionReconfigurationComplete message (in LTE) or RRCReconfigurationComplete message (in NR), sent in response to the RRCConnectionReconfiguration message (in LTE) or RRCReconfiguration message (in NR) sent from the target access node 112. The PDCP Status Report is then included (multiplexed) in the RRCConnectionReconfigurationComplete/RRCReconfigurationComplete message.

In another alternative, it is a new type of PDCP Control PDU, such as Handover Completed Control PDU. In the latter alternative, the Handover Completed Control PDU also resembles the function of PDCP Status Report and thus the PDCP Status Report is not needed. Also here the Handover Completed Control PDU is typically received for each radio bearer or is a single Handover Completed Control PDU containing an indication for each bearer.

In yet another alternative the PDCP Status Report in itself serves as an indication that the UE has released the source cell connection. This alternative may be useful for instance when the source cell is released by the UE 120 based on e.g. a timer rather than an explicit message from the target access node 112.

In yet another alternative, it is the source access node 111 that indicates to the target access node 112 that the source cell connection has been released.

Action 1306: The target access node 112 uses the information in the received PDCP status report to discard duplicated packets, which would otherwise have been forwarded to the UE 120 using the SDU/PDCP discard function for each radio bearer. These discarded packets may be packets that were buffered in the target access node, pending transmission to the UE 120, or packets received from the source access node after reception of the PDCP status report from the UE 120.

Different embodiment alternatives (as described from the UE's point of view above) involves transmitting a PDCP status report (or equivalent information) at different points in the handover procedure and may comprise sending multiple PDCP status reports (or equivalent information). Some of these alternatives thus deviates from the embodiment depicted in FIG. 13 and its associated text. However, the main principles are similar, especially from the perspective of the target access node 112, and in any case, the target access node 112 acts in accordance with the latest received PDCP status report (or equivalent information).

In some embodiments:

1. A method in the UE 120 to perform handover or secondary node change, comprising:

a. Triggering a handover or secondary node change from the source access node 111 to a target access node 112.

b. Establishing a radio connection with the target access node 112 c. Releasing the radio connection with the source access node 111 d. Sending a status report message to the target access node 112

2. Method as in 1, where the status report message indicates the sequence number of the last received packet from either the source or target access node 111, 112.

3. Method in 2, the sequence number indicated in the status report corresponds to a packet from either the source or target access node 111, 112 after having established the radio connection with the target access node 112.

4. Method in 1, where the UE 120 is triggered to perform an enhanced make-before-break handover.

5. Method in 1, where the UE 120 is triggered to perform an enhanced make-before-break SCG change.

There are also embodiments where the PDCP report may be sent prior to the release of the source cell, but which are potentially followed by one or more additional PDCP status report(s), if the DL PDCP SN status changes (i.e. the source cell receives DL PDCP packets from the source access node) after the first PDCP status report has been sent to the target access node and before the link to the source access node is released.

Figure 14A:
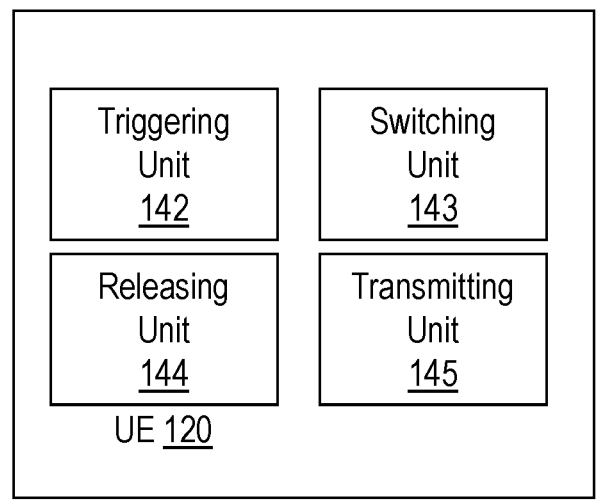
FIG. 14a is a block diagram depicting a UE according to embodiments herein.
Figure 14B:
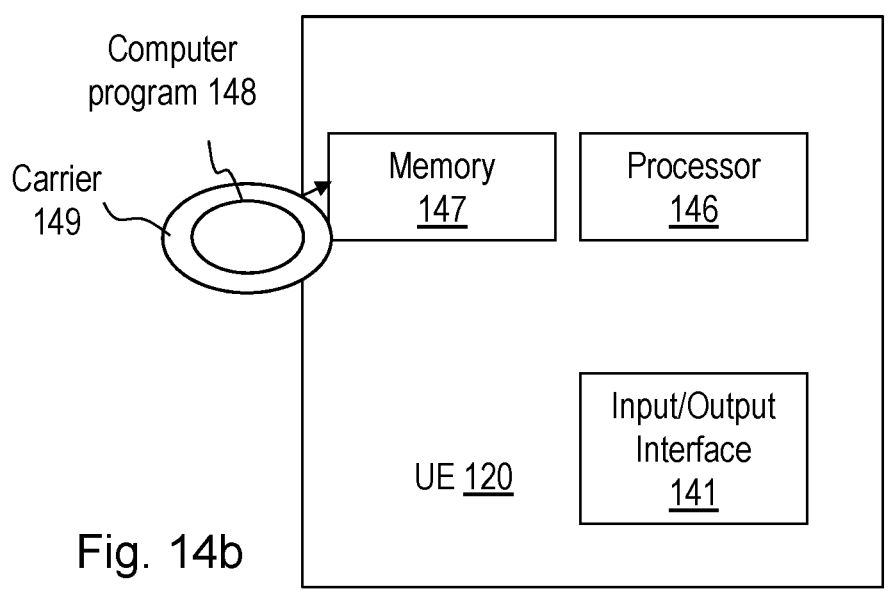
FIG. 14b is a block diagram depicting a UE according to embodiments herein.
Figure 15A:
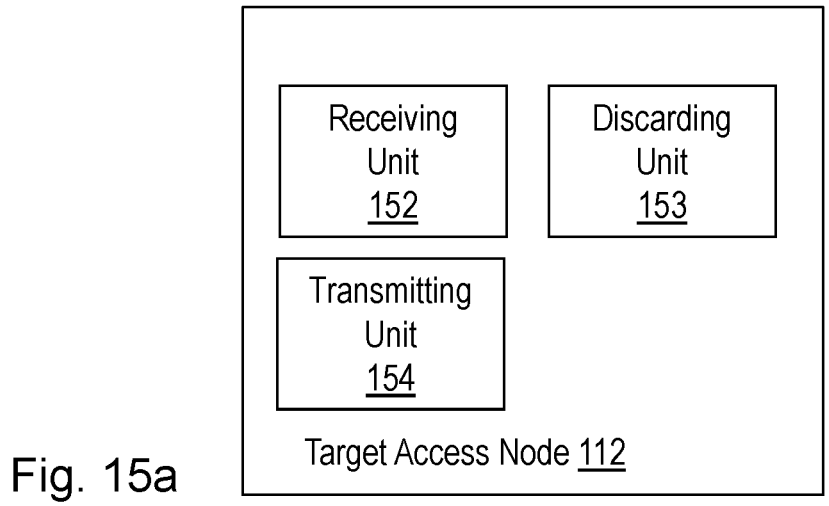
FIG. 15a is a block diagram depicting a target access node according to embodiments herein.
Figure 15B:
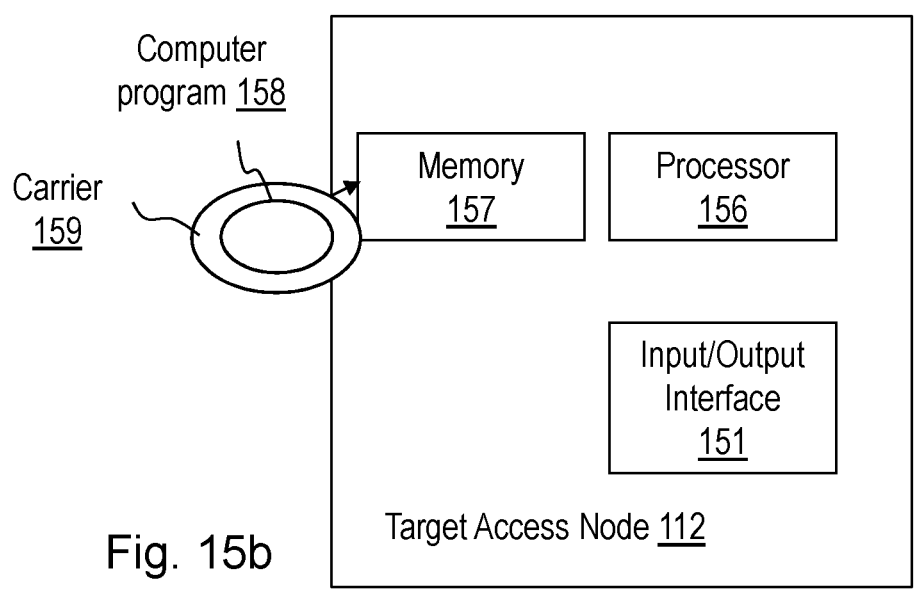
FIG. 15b is a block diagram depicting a target access node according to embodiments herein.

FIGS. 14*a* and 14*b* shows an example of the UE 120, and FIGS. 15*a* and 15*b* shows an example of the target access node 112.

The UE 120 and the target access node 112 may comprise a respective input and output interface 141, 151 configured to communicate with each other, see FIGS. 14*b*, and 15*b*. The input and output interface 141, 151 may comprise a wireless receiver (not shown) and a wireless transmitter (not shown).

The UE 120 may further comprise a triggering unit 142, a switching unit 143, a releasing unit 144, and a transmitting unit 145, see FIGS. 14*a*.

The target access node 112 may further comprise a receiving unit 152, a discarding unit 153, and a transmitting unit 154, see FIGS. 15*a*.

The embodiments herein may be implemented through a respective processor or one or more processors, such as the processor 146, 156 of a processing circuitry in the target access node 112, and the UE 120 depicted in FIGS. 14*b* and 15*b* together with computer program code 148, 158 for performing the functions and actions of the embodiments herein. The program code mentioned above may also be provided as a computer program product, for instance in the form of a data carrier 149, 159 carrying computer program code 148, 158 for performing the embodiments herein when being loaded into the respective target access node 112 and UE 120. One such carrier may be in the form of a CD ROM disc. It is however feasible with other data carriers such as a memory stick. The computer program code may furthermore be provided as pure program code on a server and downloaded to the respective target access node 112 and UE 120.

The target access node 112 and the UE 120 may further comprise respective a memory 147, 157 comprising one or more memory units. The memory comprises instructions executable by the processor in the respective target access node 112 and UE 120.

The memory 147, 157 is arranged to be used to store e.g. information, data, configurations, and applications to perform the methods herein when being executed in the respective target access node 112 and UE 120.

In some embodiments, a respective computer program 148, 158 comprises instructions, which when executed by the at least one processor 146, 156, cause the at least one processor 146, 156 of the respective the target access node 112 and UE 120 to perform the actions above.

In some embodiments, a respective carrier 149, 159 comprises the respective computer program 148, 158, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the respective target access node 112 and UE 120, that when executed by the respective one or more processors such as the processors 146, 156 described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-24 are described below. The following embodiments refer among other things to FIG. 12, 13, 14*a-b*, and 15*a-b*.

Embodiment 1. A method performed by a User Equipment, UE, 120 for performing a handover of one or more radio bearers from a source access node 111 to a target access node 112 in a wireless communications network 100, the method comprising:
  triggering 1201 the UE 120 to perform the handover,
  after establishing a radio connection for the radio bearers with the target access node 112, switching 1202 an uplink, UL, transmission of Packet Data Convergence Protocol, PDCP, Service Data Units, SDUs, from the source access node 111 to the target access node 112 over the established connection, and
  after releasing 1203 a radio connection with the source access node 111, transmitting 1204 a status report, e.g. a PDCP status report, to the target access node 112, for each radio bearer out of the one or more radio bearers, which respective status report indicates which PDCP SDUs that have been received by any one or more out of: the source access node 111 or the target access node 112.

Embodiment 2. The method according to embodiment 1, wherein a first status report has been sent before releasing 1203 the radio connection with the source access node 112, and wherein the status report transmitted after releasing 1203 the radio connection with the source access node 111, is a second status report.

Embodiment 3. The method according to embodiment 2, wherein the second status report is sent when the UE 120 successfully receives one or more additional SDUs from the source access node 111 before the UE 120 has released the radio connection with the source access node 112.

Embodiment 4. The method according to any of the embodiments 1-3, wherein the status report is transmitted in any one out of:
  multiplexed with a Radio resource Control, RRC, message
  a message multiplexed with an RRC response message of a RRC "Release source cell" message, or inside this RRC response message,
  an RRC response message of a RRC "Release source cell" message multiplexed with a RRC Connection Reconfiguration Complete message,
  an RRC Reconfiguration Complete message,
  a PDCP Control PDU message,
  a Handover Completed Control PDU message, or
  together with a first transmitted UL data packet to the target access node 112.

Embodiment 5. The method according to any of the embodiments 1-4, wherein the handover is represented by any one out of: a secondary node change, an enhanced make-before-break handover or an enhanced make-before-break SCG change.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A method performed by a target access node 112 for handling a handover of one or more radio bearers of a User Equipment, UE, 120 from a source access node 111 to the target access node 112 in a wireless communications network 100, the method comprising:
  receiving 1301 from the source access node 111, an indication that the handover of the one or more radio bearers of the UE 120 is being performed,
  receiving 1302 from the source access node 111, forwarded Packet Data Convergence Protocol, PDCP, Service Data Units, SDUs, and
  receiving 1303 from the UE 120, a status report, e.g. a PDCP status report, for each radio bearer out of the one or more radio bearers, which respective status report indicates which PDCP SDUs that have been received by any one or more out of: the source access node 111 or the target access node 112, and an indication that the UE 120 has released a radio connection with the source access node 111, and discarding 1304 received duplicated PDCP SDUs that are to be forwarded to the UE 120.

Embodiment 9. The method according to embodiment 8, wherein a first status report has been received before the UE 120 has released the radio connection with the source access node 111, and wherein the status report received after the UE has released the radio connection with the source access node 111, is a second status report.

Embodiment 10. The method according to embodiment 9, wherein the second status report is received when the UE 120 has successfully received one or more additional SDUs from the source access node 111 before the UE 120 has released the radio connection with the source access node 112.

Embodiment 11. The method according to any of the embodiments 8-10, wherein the status report is received in any one out of:
- multiplexed with a Radio resource Control, RRC, message
- a message multiplexed with an RRC response message of a RRC "Release source cell" message, or inside this RRC response message,
- an RRC response message of a RRC "Release source cell" message multiplexed with a RRC Connection Reconfiguration Complete message,
- an RRC Reconfiguration Complete message,
- a PDCP Control PDU message,
- a Handover Completed Control PDU message, or
- together with a first transmitted UL data packet to the target access node 112.

Embodiment 12. The method according to any of the embodiments 8-11, wherein the handover is represented by any one out of: a secondary node change, an enhanced make-before-break handover or an enhanced make-before-break SCG change.

Embodiment 13. A computer program comprising instructions, which when executed by a processor, causes the processor to perform actions according to any of the embodiments 8-12.

Embodiment 14. A carrier comprising the computer program of embodiment 13, wherein the carrier is one of an electronic signal, an optical signal, an electromagnetic signal, a magnetic signal, an electric signal, a radio signal, a microwave signal, or a computer-readable storage medium.

Embodiment 15. A User Equipment, UE 120, configured to perform a handover of one or more radio bearers from a source access node 111 to a target access node 112 in a wireless communications network 100, the UE 120 further being configured to:
- trigger the UE 120 to perform the handover, e.g. by means of a triggering unit in the UE 120,
- after establishing a radio connection for the radio bearers with the target access node 112, switch an uplink, UL, transmission of Packet Data Convergence Protocol, PDCP, Service Data Units, SDUs, from the source access node 111 to the target access node 112 over the established connection, e.g. by means of a switching unit in the UE 120, and
- after releasing a radio connection with the source access node 111, e.g. by means of a releasing unit in the UE 120, transmitting a status report, e.g. a PDCP status report, to the target access node 112, for each radio bearer out of the one or more radio bearers, which respective status report is adapted to indicate which PDCP SDUs that have been received by any one or more out of: the source access node 111 or the target access node 112, e.g. by means of a transmitting unit in the UE 120.

Embodiment 16. The UE 120 according to embodiment 15, wherein a first status report is adapted to have been sent before releasing the radio connection with the source access node 112, and wherein the status report transmitted after releasing the radio connection with the source access node 111, is adapted to be a second status report.

Embodiment 17. The UE 120 according to embodiment 16, wherein the second status report is adapted to be sent when the UE 120 successfully receives one or more additional SDUs from the source access node 111 before the UE 120 has released the radio connection with the source access node 112.

Embodiment 18. The UE 120 according to any of the embodiments 15-17, wherein the status report is adapted to be transmitted in any one out of:
- multiplexed with a Radio resource Control, RRC, message
- a message multiplexed with an RRC response message of a RRC "Release source cell" message, or inside this RRC response message,
- an RRC response message of a RRC "Release source cell" message multiplexed with a RRC Connection Reconfiguration Complete message,
- an RRC Reconfiguration Complete message,
- a PDCP Control PDU message,
- a Handover Completed Control PDU message, or
- together with a first transmitted UL data packet to the target access node 112.

19. The UE 120 according to any of the embodiments 15-18, wherein the handover is adapted to be represented by any one out of: a secondary node change, an enhanced make-before-break handover or an enhanced make-before-break SCG change.

20. A target access node 112 configured to handle a handover of one or more radio bearers of a User Equipment, UE, 120 from a source access node 111 to the target access node 112 in a wireless communications network 100, the target access node 112 further being configured to:
- receive from the source access node 111 an indication that the handover of the one or more radio bearers of the UE 120 is being performed, e.g. by means of a receiving unit in the target access node 112,
- receive from the source access node 111, forwarded Packet Data Convergence Protocol, PDCP, Service Data Units, SDUs, e.g. by means of a receiving unit in the target access node 112, and
- receive from the UE 120, a status report, e.g. a PDCP status report, for each radio bearer out of the one or more radio bearers, which respective status report are adapted to indicate which PDCP SDUs that have been received by any one or more out of: the source access node 111 or the target access node 112, and an indication that the UE 120 has released a radio connection with the source access node 111, e.g. by means of the receiving unit in the target access node 112, and
- discard received duplicated PDCP SDUs that are to be forwarded to the UE 120, e.g. by means of a discarding unit in the target access node 112.

Embodiment 21. The target access node 112 according to embodiment 20, wherein a first status report is adapted to have been received before the UE 120 has released the radio connection with the source access node 111, and wherein the status report received after the UE has released the radio connection with the source access node 111, is adapted to be a second status report.

Embodiment 22. The target access node 112 according to embodiment 21, wherein the second status report is adapted to be received when the UE 120 has successfully received one or more additional SDUs from the source access node 111 before the UE 120 has released the radio connection with the source access node 112.

Embodiment 23. The target access node 112 according to any of the embodiments 20-22, wherein the status report is adapted to be received in any one out of:

multiplexed with a Radio resource Control, RRC, message a message multiplexed with an RRC response message of a RRC "Release source cell" message, or inside this RRC response message, an RRC response message of a RRC "Release source cell" message multiplexed with a RRC Connection Reconfiguration Complete message, an RRC Reconfiguration Complete message, a PDCP Control PDU message, a Handover Completed Control PDU message, or together with a first transmitted UL data packet to the target access node 112.

Embodiment 24. The target access node 112 according to any of the embodiments 20-23, wherein the handover is adapted to be represented by any one out of: a secondary node change, an enhanced make-before-break handover or an enhanced make-before-break SCG change.

Figure 16:
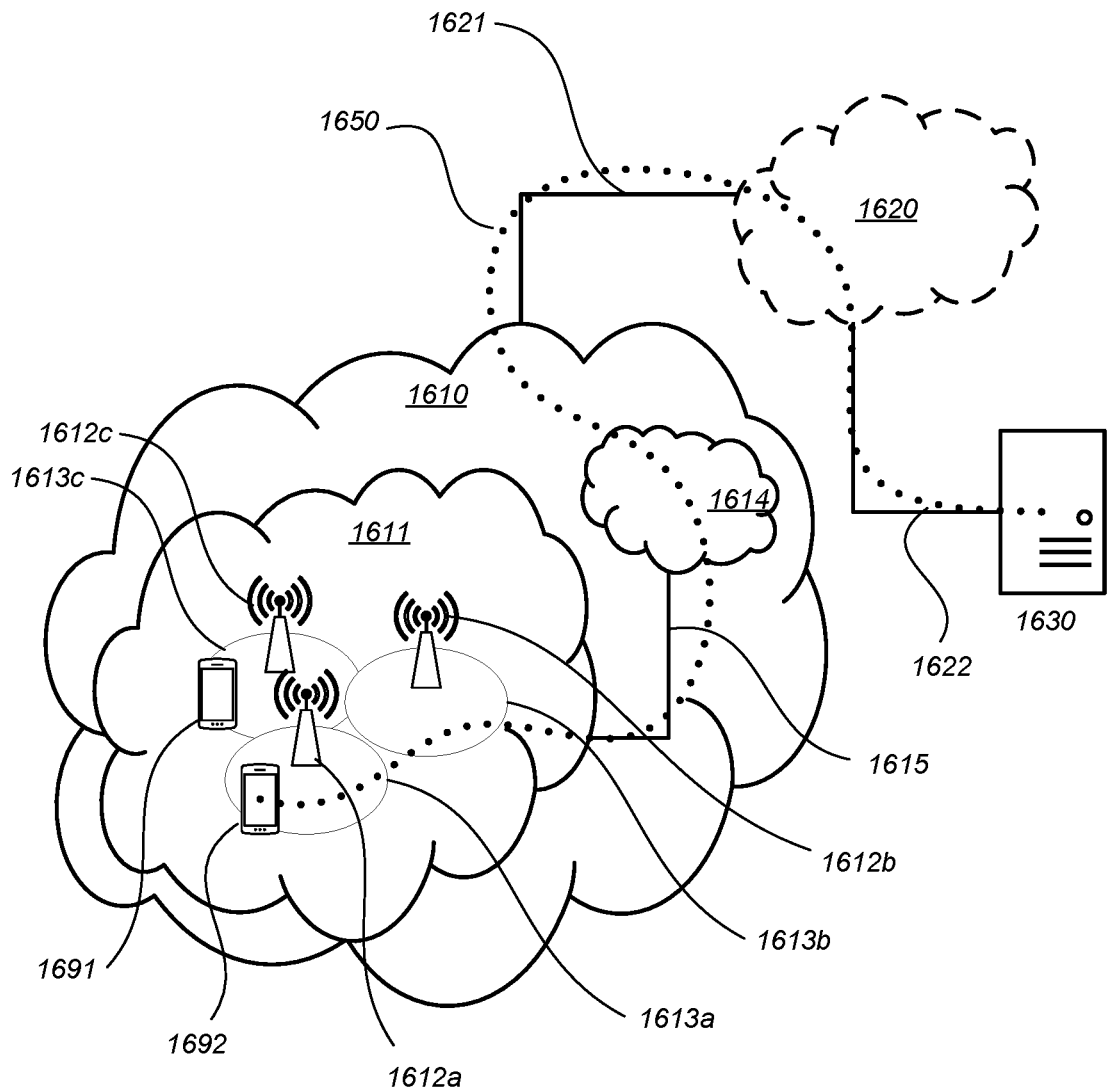
FIG. 16 is a schematic block diagram illustrating a telecommunication network connected via an intermediate network to a host computer.

With reference to FIG. 16, in accordance with an embodiment, a communication system includes a telecommunication network 1610, such as a 3GPP-type cellular network, which comprises an access network 1611, such as a radio access network, and a core network 1614. The access network 1611 comprises a plurality of base stations 1612a, 1612b, 1612c, such as the source and target access node 111, 112, AP STAs NBs, eNBs, gNBs or other types of wireless access points, each defining a corresponding coverage area 1613a, 1613b, 1613c. Each base station 1612a, 1612b, 1612c is connectable to the core network 1614 over a wired or wireless connection 1615. A first user equipment (UE) such as a Non-AP STA 1691 located in coverage area 1613c is configured to wirelessly connect to, or be paged by, the corresponding base station 1612c. A second UE 1692 such as a Non-AP STA in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 as a whole enables connectivity between one of the connected UEs 1691, 1692 such as e.g. the UE 120, and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 may not or need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630. Example implementations, in accordance with an embodiment, of the UE, base station and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the base station 1720. The communication interface 1726 may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides. It is noted that the host computer 1710, base station 1720 and UE 1730 illustrated in FIG. 17 may be identical to the host computer 1630, one of the base stations 1612a, 1612b, 1612c and one of the UEs 1691, 1692 of FIG. 16, respectively. This is to say, the inner workings of these entities may be as shown in FIG. 17 and independently, the surrounding network topology may be that of FIG. 16.

Figure 17:
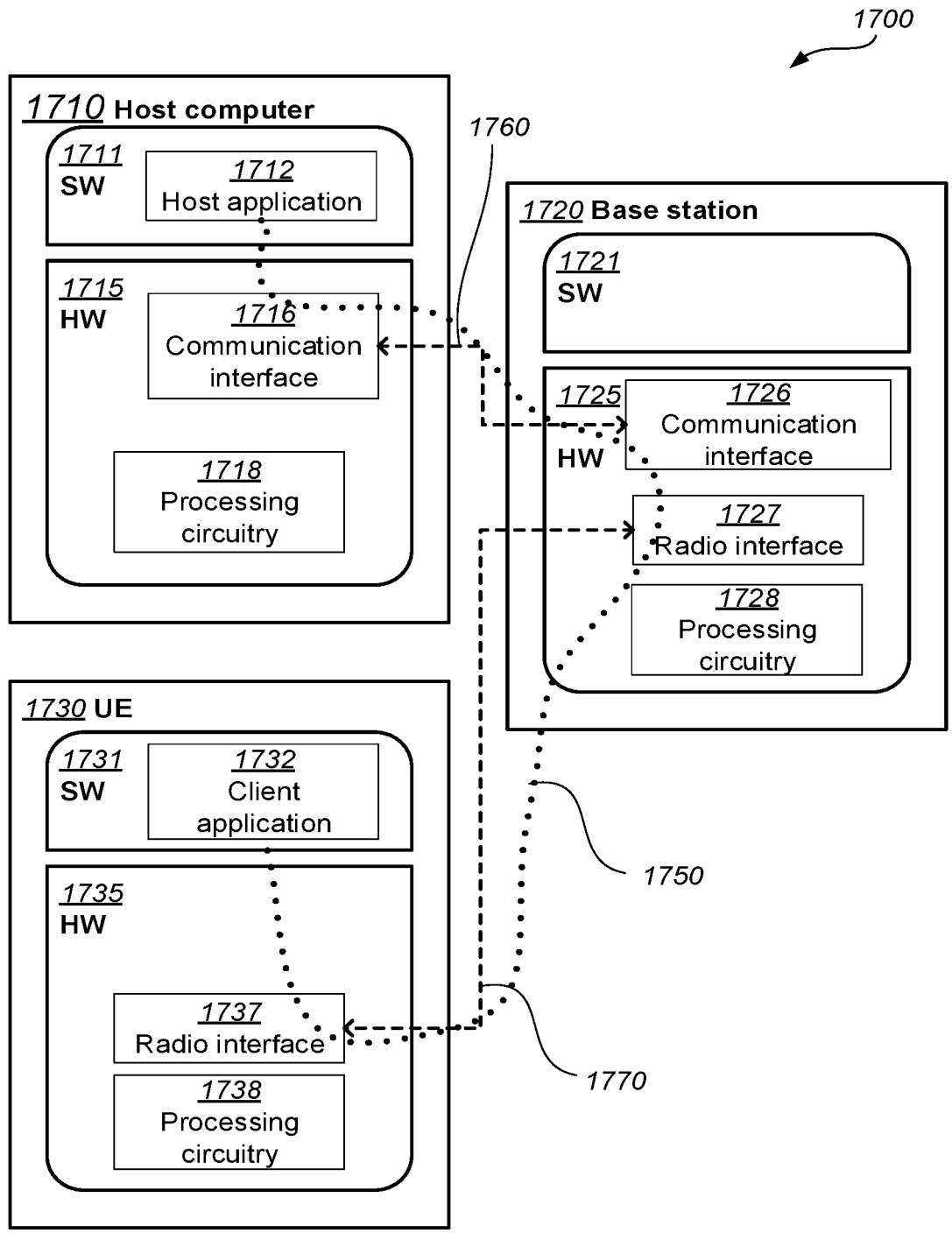
FIG. 17 is a schematic block diagram of a host computer communicating via a base station with a UE over a partially wireless connection.

In FIG. 17, the OTT connection 1750 has been drawn abstractly to illustrate the communication between the host computer 1710 and the use equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or 'dummy' messages, using the OTT connection 1750 while it monitors propagation times, errors etc.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 18 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 19 will be included in this section. In a first step 1910 of the method, the host computer provides user data. In an optional substep (not shown) the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

Figures 20, 21:
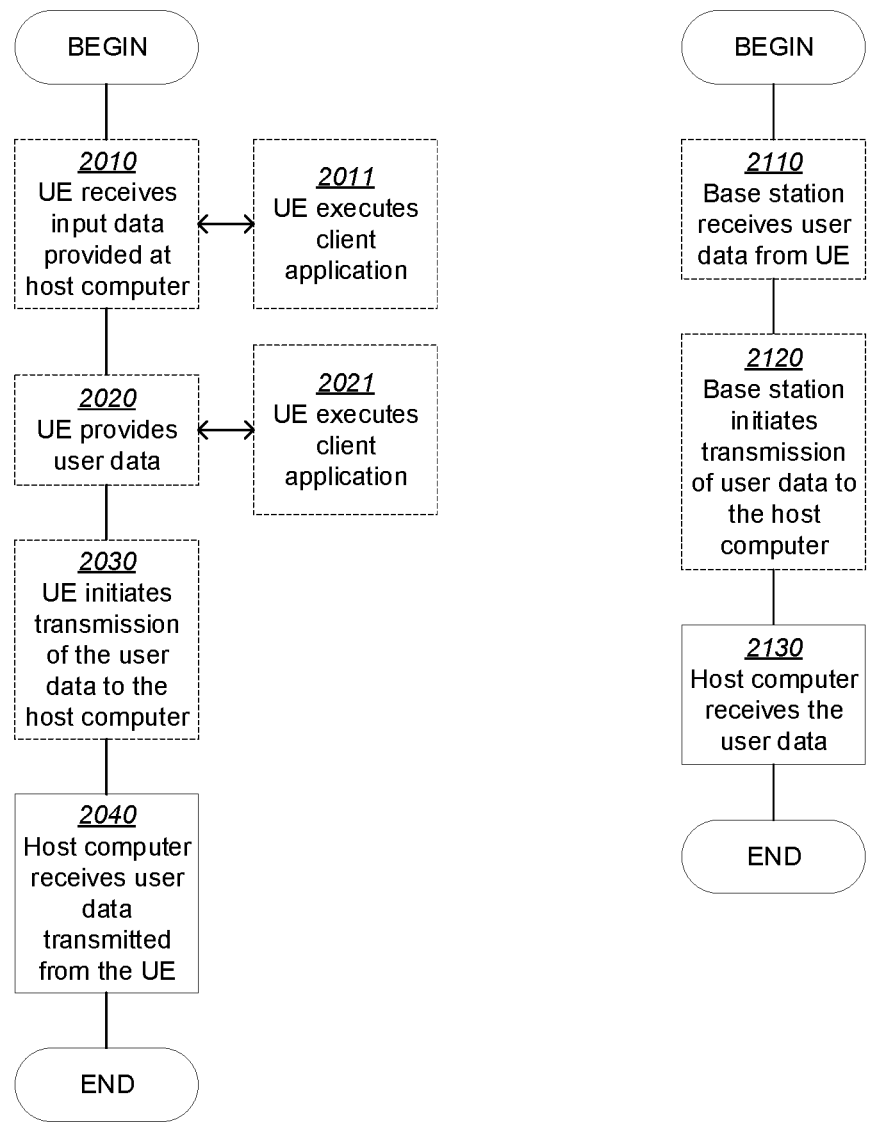
FIG. 20 is a flowchart depicting embodiments of a method in a communications system comprising a host computer, a base station and a UE.
FIG. 21 is a flowchart depicting embodiments of a method in a communications system comprising a host computer, a base station and a UE.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 20 will be included in this section. In an optional first step 2010 of the method, the UE receives input data provided by the host computer. Additionally or alternatively, in an optional second step 2020, the UE provides user data. In an optional substep 2021 of the second step 2020, the UE provides the user data by executing a client application. In a further optional substep 2011 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2030, transmission of the user data to the host computer. In a fourth step 2040 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 21 will be included in this section. In an optional first step 2110 of the method, in accordance with the teachings of the embodiments described throughout this disclosure, the base station receives user data from the UE. In an optional second step 2120, the base station initiates transmission of the received user data to the host computer. In a third step 2130, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

| Abbreviation | Explanation |
|---|---|
| 5G | 5th Generation |
| 5GS | 5G System |
| 5GC | 5G Core network |
| AMF | Access and Mobility Management Function |
| ARQ | Automated Repeat Request |
| CHO | Conditional Handover |
| C-RNTI | Cell RNTI |
| CU | Central Unit |
| DU | Distributed Unit |
| eICIC | Enhanced Inter-Cell Interference Coordination |
| eNB | Evolved Node B |
| E-UTRAN | Evolved Universal Terrestrial Access Network |
| EPC | Evolved Packet Core network |
| gNB | 5G Node B |
| HARQ | Hybrid Automatic Repeat Request |
| HO | Handover |
| ICIC | Inter-Cell Interference Coordination |
| MAC | Medium Access Control |
| MBB | Make-Before-Break |
| MME | Mobility Management Entity |
| NCC | Next Hop Chaining Counter |
| NG | The interface/reference point between the RAN and the CN in 5G/NR. |
| NG-C | The control plane part of NG (between a gNB and an AMF). |
| NG-U | The user plane part of NG (between a gNB and a UPF). |
| NG-RAN | Next Generation Radio Access Network |
| NR | New Radio |
| PHY | Physical layer |

| Abbreviation | Explanation |
|---|---|
| RA | Random Access |
| RACH | Random Access Channel |
| RAR | Random Access Response |
| ROHC | Robust Header Compression |
| RNTI | Radio Network Temporary Identifier |
| Rx | Receive |
| S1 | The interface/reference point between the RAN and the CN in LTE. |
| S1-C | The control plane part of S1 (between an eNB and a MME). |
| S1-U | The user plane part of S1 (between an eNB and a SGW). |
| SGW | Serving Gateway |
| TS | Technical Specification |
| Tx | Transmit |
| UPF | User Plane Function |
| URLLC | Ultra-Reliable Low-Latency Communication |
| X2 | The interface/reference point between two eNBs. |
| X2AP | X2 Application Protocol |
| Xn | The interface/reference point between two gNBs. |
| XnAP | Xn Application Protocol |

The invention claimed is:

1. A method performed by a User Equipment (UE) for handling Packet Data Convergence Protocol (PDCP) Service Data Units (SDUs) when performing a Dual Active Protocol Stack (DAPS) handover of at least one radio bearer from a source access node to a target access node in a wireless communications network, the method comprising the UE:
   obtaining a trigger to perform the handover of the at least one radio bearer from the source access node to the target access node;
   establishing a radio connection for the at least one radio bearer with the target access node;
   switching an uplink (UL) transmission of PDCP SDUs from the source access node to the target access node over the established radio connection;
   transmitting a first PDCP status report before releasing a radio connection with the source access node;
   releasing the radio connection with the source access node; and
   after releasing the radio connection with the source access node, transmitting a second PDCP status report to the target access node for each radio bearer of the at least one radio bearer, which respective second PDCP status report comprises a bitmap field wherein bits in the bitmap field indicate whether a PDCP SDU is received by the UE.

2. The method of claim 1 further comprising receiving, from the target access node, a message triggering the release of the radio connection with the source access node, wherein the message triggering the release of the radio connection is a Radio Resource Control (RRC) Connection Reconfiguration message and/or an RRC Reconfiguration message.

3. The method of claim 1, wherein the second PDCP status report is transmitted:
   multiplexed with a Radio Resource Control (RRC) message;
   in a message multiplexed with an RRC response message of a RRC "Release source cell" message, or inside this RRC response message;
   in an RRC response message of an RRC "Release source cell" message multiplexed with an RRC Connection Reconfiguration Complete message;
   in an RRC Reconfiguration Complete message;
   in a PDCP Control Protocol Data Unit (PDU) message;

in a Handover Completed Control PDU message; or
together with a first transmitted UL data packet to the target access node.

4. The method of claim 1, wherein the second PDCP status report is transmitted to the target access node for each Radio Link Control-Acknowledged Mode (RLC-AM) bearer configured to the UE.

5. A method performed by a target access node for handling Packet Data Convergence Protocol (PDCP) Service Data Units (SDUs) during a Dual Active Protocol Stack (DAPS) handover of at least one radio bearer of a User Equipment (UE) from a source access node to the target access node in a wireless communications network, the method comprising the target access node:
receiving, from the source access node, an indication that the handover of the at least one radio bearer of the UE is being performed;
receiving, from the source access node, forwarded PDCP SDUs;
receiving a first PDCP status report before receiving an indication from the UE that the UE has released a radio connection with the source access node;
receiving, from the UE, the indication that the UE has released the radio connection with the source access node and a second PDCP status report for each radio bearer of the at least one radio bearer, which respective second PDCP status report comprises a bitmap field wherein bits in the bitmap field indicate whether a PDCP SDU is received by the UE; and
discarding, based on the received second PDCP status report, PDCP SDUs received from the source access node to avoid forwarding duplicated PDCP SDUs to the UE.

6. The method of claim 5 further comprising transmitting, to the UE, a message triggering the release of the radio connection with the source access node, wherein the message is a Radio Resource Control (RRC) Connection Reconfiguration message and/or an RRC Reconfiguration message.

7. The method of claim 5, wherein the second PDCP status report is received:
as multiplexed with a Radio Resource Control (RRC) message;
in a message multiplexed with an RRC response message of an RRC "Release source cell" message, or inside this RRC response message;
in an RRC response message of an RRC "Release source cell" message multiplexed with an RRC Connection Reconfiguration Complete message;
in an RRC Reconfiguration Complete message;
in a PDCP Control Protocol Data Unit (PDU) message;
in a Handover Completed Control PDU message; or
together with a first transmitted UL data packet to the target access node.

8. The method of claim 5, wherein the second PDCP status report is received for each Radio Link Control-Acknowledged Mode (RLC-AM) bearer configured to the UE.

9. A User Equipment (UE) configured to handle Packet Data Convergence Protocol (PDCP) Service Data Units (SDUs) when performing a Dual Active Protocol Stack (DAPS) handover of at least one radio bearer from a source access node to a target access node in a wireless communications network; the UE comprising:
processing circuitry; and
memory containing instructions executable by the processing circuitry whereby the UE is operative to:
obtain a trigger to perform the handover of the at least one radio bearer from the source access node to the target access node;
establish a radio connection for the at least one radio bearer with the target access node;
switch an uplink (UL) transmission of PDCP SDUs from the source access node to the target access node over the established radio connection;
transmit a first PDCP status report before a radio connection with the source access node is released;
release the radio connection with the source access node; and
after releasing the radio connection with the source access node, transmit a second PDCP status report to the target access node for each radio bearer of the at least one radio bearer, which respective second PDCP status report comprises a bitmap field wherein bits in the bitmap field indicate whether a PDCP SDU is received by the UE.

10. The UE of claim 9:
wherein the instructions are such that the UE is operative to receive, from the target access node, a message triggering the release of the radio connection with the source access node; and
wherein the message triggering the release of the radio connection is a Radio Resource Control (RRC) Connection Reconfiguration message and/or an RRC Reconfiguration message.

11. The UE of claim 9, wherein the second PDCP status report is transmitted:
multiplexed with a Radio Resource Control (RRC) message;
in a message multiplexed with an RRC response message of a RRC "Release source cell" message, or inside this RRC response message;
in an RRC response message of an RRC "Release source cell" message multiplexed with an RRC Connection Reconfiguration Complete message;
in an RRC Reconfiguration Complete message;
in a PDCP Control Protocol Data Unit (PDU) message;
in a Handover Completed Control PDU message; or
together with a first transmitted UL data packet to the target access node.

12. The UE of claim 9, wherein the second PDCP status report is transmitted to the target access node for each Radio Link Control-Acknowledged Mode (RLC-AM) bearer configured to the UE.

13. A target access node configured to handle Packet Data Convergence Protocol (PDCP) Service Data Units (SDUs) during a Dual Active Protocol Stack (DAPS) handover of at least one radio bearer of a User Equipment (UE) from a source access node to the target access node in a wireless communications network; the target access comprising:
processing circuitry;
memory containing instructions executable by the processing circuitry whereby the target access node is operative to:
receive, from the source access node, an indication that the handover of the at least one radio bearer of the UE is being performed;
receive, from the source access node, forwarded PDCP SDUs;
receive a first PDCP status report before receiving an indication that the UE has released a radio connection with the source access node;
receive, from the UE, the indication that the UE has released the radio connection with the source access node and a second PDCP status report for each radio bearer of the at least one radio bearer, which respective second PDCP status report comprises a bitmap field wherein bits in the bitmap field indicate whether a PDCP SDU is received by the UE; and discard PDCP SDUs received from the source access node based on the received second PDCP status report to avoid forwarding duplicated PDCP SDUs to the UE.

14. The target access node of claim 13:
wherein the instructions are such that the target access nodes is operative to transmit, to the UE, a message to trigger the release of the radio connection with the source access node; and
wherein the message is a Radio Resource Control (RRC) Connection Reconfiguration message or an RRC Reconfiguration message.

15. The target access node of claim 13, wherein the second PDCP status report is received:
as multiplexed with an Radio Resource Control (RRC) message;
in a message multiplexed with an RRC response message of an RRC "Release source cell" message, or inside this RRC response message;
in an RRC response message of an RRC "Release source cell" message multiplexed with an RRC Connection Reconfiguration Complete message;
in an RRC Reconfiguration Complete message;
in a PDCP Control Protocol Data Unit (PDU) message;
in a Handover Completed Control PDU message; or
together with a first transmitted UL data packet to the target access node.

16. The target access node of claim 13, wherein the second PDCP status report is received for each Radio Link Control-Acknowledged Mode (RLC-AM) bearer configured to the UE.

17. A non-transitory computer readable recording medium storing a computer program product for controlling a User Equipment (UE) for handling Packet Data Convergence Protocol (PDCP) Service Data Units (SDUs) when performing a Dual Active Protocol Stack (DAPS) handover of at least one radio bearer from a source access node to a target access node in a wireless communications network; the computer program product comprising program instructions which, when run on processing circuitry of the UE, causes the UE to:

obtain a trigger to perform the handover of the at least one radio bearer from the source access node to the target access node;
establish a radio connection for the at least one radio bearer with the target access node;
switch an uplink (UL) transmission of PDCP SDUs from the source access node to the target access node over the established radio connection;
transmit a first PDCP status report before releasing a radio connection with the source access node;
release the radio connection with the source access node; and
after releasing the radio connection with the source access node, transmit a second PDCP status report to the target access node for each radio bearer of the at least one radio bearer, which respective second PDCP status report comprises a bitmap field wherein bits in the bitmap indicate whether a PDCP SDU is received by the UE.

18. A non-transitory computer readable recording medium storing a computer program product for controlling a target access node for handling Packet Data Convergence Protocol (PDCP) Service Data Units (SDUs) during a Dual Active Protocol Stack (DAPS) handover of at least one radio bearer of a User Equipment (UE) from a source access node to the target access node in a wireless communications network; the computer program product comprising program instructions which, when run on processing circuitry of the target access node, causes the target access node to:
receive, from the source access node, an indication that the handover of the at least one radio bearer of the UE is being performed;
receive, from the source access node, forwarded PDCP SDUs;
receive a first PDCP status report before receiving an indication that the UE has released a radio connection with the source access node;
receive, from the UE, the indication that the UE has released the radio connection with the source access node and a second PDCP status report for each radio bearer of the at least one radio bearer, which respective second PDCP status report comprises a bitmap field wherein bits in the bitmap field indicate whether a PDCP SDU is received by the UE; and
discard, based on the received second PDCP status report, PDCP SDUs received from the source access node to avoid forwarding duplicated PDCP SDUs to the UE.

* * * * *

UNITED STATES PATENT AND TRADEMARK OFFICE
CERTIFICATE OF CORRECTION

PATENT NO. : 12,200,478 B2
APPLICATION NO. : 17/633248
DATED : January 14, 2025
INVENTOR(S) : Wallentin et al.

Page 1 of 1

It is certified that error appears in the above-identified patent and that said Letters Patent is hereby corrected as shown below:

In the Specification

In Column 18, Line 14, delete "SGC;" and insert -- 5GC; --, therefor.

In Column 35, Line 53, delete "Evolved Universal Terrestrial Access Network" and insert -- Evolved Universal Terrestrial Radio Access Network --, therefor.

In Column 35, Line 54, delete "EPC" and insert -- EPCN --, therefor.

Signed and Sealed this
Twelfth Day of August, 2025

Coke Morgan Stewart
*Acting Director of the United States Patent and Trademark Office*